United States Patent
Bodet et al.

(10) Patent No.: US 10,343,479 B2
(45) Date of Patent: Jul. 9, 2019

(54) PNEUMATIC CIRCUIT FOR PASSENGER CAR PNEUMATIC SUSPENSION SYSTEM

(71) Applicant: WABCO GmbH, Hannover (DE)

(72) Inventors: Marc-Michel Bodet, Wunstorf (DE); Frank Meissner, Hannover (DE)

(73) Assignee: WABCO GMBH, Hannover (DE)

( * ) Notice: Subject to any disclaimer, the term of this patent is extended or adjusted under 35 U.S.C. 154(b) by 296 days.

(21) Appl. No.: 15/505,251

(22) PCT Filed: Aug. 21, 2015

(86) PCT No.: PCT/EP2015/001716
§ 371 (c)(1),
(2) Date: Feb. 21, 2017

(87) PCT Pub. No.: WO2016/026577
PCT Pub. Date: Feb. 25, 2016

(65) Prior Publication Data
US 2019/0030976 A1 Jan. 31, 2019

(30) Foreign Application Priority Data

Aug. 22, 2014 (DE) .......................... 10 2014 012 609
Aug. 22, 2014 (DE) .......................... 10 2014 012 680

(51) Int. Cl.
*B60G 17/052* (2006.01)
*B60T 17/02* (2006.01)
(Continued)

(52) U.S. Cl.
CPC .......... *B60G 17/0523* (2013.01); *B60T 17/02* (2013.01); *F04B 49/06* (2013.01);
(Continued)

(58) Field of Classification Search
CPC .......... B60G 17/0523; B60G 2500/201; B60G 2500/2044; B60G 2500/204;
(Continued)

(56) References Cited

U.S. PATENT DOCUMENTS

| 4,756,548 A | 7/1988 | Kaltenthaler et al. |
| 6,098,967 A | 8/2000 | Folchert |

(Continued)

FOREIGN PATENT DOCUMENTS

| DE | 3542974 A1 | 6/1987 |
| DE | 3919438 A1 | 12/1990 |

(Continued)

*Primary Examiner* — Paul N Dickson
*Assistant Examiner* — Timothy Wilhelm
(74) *Attorney, Agent, or Firm* — Leydig, Voit & Mayer, Ltd.

(57) ABSTRACT

A compressed air supply installation for the operation of a pneumatic system includes a compressed air feed, a compressed air connection to a pneumatic unit, a venting connection, a main pneumatic line disposed between the compressed air feed and the compressed air connection, and a first venting line disposed between the compressed air connection and the venting connection, the first venting line including a venting valve including a first venting valve connection, a second venting valve connection, and a control connection pneumatically connected to a control valve by a pneumatic control relay line. The venting valve is closed between the first venting valve connection and the second venting valve connection to the venting connection in a first switching state of the venting valve and is opened between the first venting valve connection and the second venting valve connection to the venting connection in a second switching state.

24 Claims, 14 Drawing Sheets

(51) Int. Cl.
*F15B 21/048* (2019.01)
*F04B 49/06* (2006.01)
*F04B 49/22* (2006.01)
*F15B 21/044* (2019.01)

(52) U.S. Cl.
CPC ............ *F04B 49/22* (2013.01); *F15B 21/044* (2013.01); *F15B 21/048* (2013.01); *B60G 2500/02* (2013.01); *B60G 2500/201* (2013.01); *B60G 2500/203* (2013.01); *B60G 2500/204* (2013.01); *B60G 2500/205* (2013.01); *B60G 2500/2044* (2013.01); *F15B 2211/30505* (2013.01); *F15B 2211/50536* (2013.01); *F15B 2211/528* (2013.01)

(58) Field of Classification Search
CPC .......... B60G 2500/203; B60G 2500/02; B60G 2500/205; F15B 21/044; F15B 21/048; F15B 2211/30505; F15B 2211/50536; F15B 2211/528; F04B 49/22; F04B 49/06; B60T 17/02
See application file for complete search history.

(56) References Cited

U.S. PATENT DOCUMENTS

| | | | | |
|---|---|---|---|---|
| 6,332,623 | B1 | 12/2001 | Behmenburg et al. | |
| 6,354,617 | B1 * | 3/2002 | Behmenburg | B60G 17/0523 137/100 |
| 6,666,078 | B1 * | 12/2003 | Claussen | B60C 23/003 73/146 |
| 6,726,224 | B2 * | 4/2004 | Jurr | B60G 17/0523 280/124.16 |
| 6,752,402 | B2 * | 6/2004 | Grotendorst | B60G 11/27 280/5.507 |
| 6,817,600 | B2 * | 11/2004 | Ocker | B60G 17/0523 267/274 |
| 6,824,145 | B2 * | 11/2004 | Behmenburg | B60C 23/10 152/416 |
| 8,777,246 | B2 * | 7/2014 | Meier | F17D 1/02 137/487.5 |
| 8,814,190 | B2 * | 8/2014 | Becher | F04B 7/02 280/124.16 |
| 8,899,598 | B2 * | 12/2014 | Frank | F16K 31/0651 137/565.18 |
| 9,010,785 | B2 * | 4/2015 | Gocz | B60G 17/0523 280/124.16 |
| 9,062,571 | B2 * | 6/2015 | Frank | F01L 1/34 |
| 9,199,524 | B2 * | 12/2015 | Stabenow | B60G 17/0525 |
| 9,371,063 | B2 * | 6/2016 | Schnittger | B60T 13/662 |
| 9,505,495 | B2 * | 11/2016 | Tobias | B64D 1/12 |
| 9,764,278 | B2 * | 9/2017 | Bergemann | B01D 53/0407 |
| 9,833,736 | B2 * | 12/2017 | Brinkmann | B01D 53/261 |
| 9,926,994 | B2 * | 3/2018 | Frank | B60G 17/0155 |
| 2002/0153688 | A1 | 10/2002 | Jurr et al. | |
| 2003/0047853 | A1 | 3/2003 | Behmenburg | |
| 2012/0285327 | A1 | 11/2012 | Schael | |
| 2013/0195682 | A1 * | 8/2013 | Becher | F04B 7/02 417/53 |
| 2013/0255787 | A1 * | 10/2013 | Frank | B60G 17/0523 137/1 |
| 2013/0276899 | A1 * | 10/2013 | Frank | F15B 21/044 137/1 |
| 2013/0318954 | A1 * | 12/2013 | Frank | B60G 17/0155 60/407 |
| 2013/0320645 | A1 * | 12/2013 | Gall | B60G 11/27 280/124.16 |
| 2015/0048577 | A1 | 2/2015 | Frank et al. | |

FOREIGN PATENT DOCUMENTS

| | | |
|---|---|---|
| DE | 19724747 C1 | 6/1998 |
| DE | 10016970 C1 | 7/2004 |
| DE | 10301119 A1 | 7/2004 |
| DE | 102010009035 A1 | 8/2011 |
| DE | 102010054704 A1 | 6/2012 |
| DE | 102011109500 A1 | 6/2012 |
| DE | 102012005303 A1 | 6/2013 |
| DE | 102012024757 A1 | 6/2014 |
| EP | 0978397 A1 | 2/2000 |
| EP | 1165333 B2 | 1/2002 |
| WO | WO 0156820 A1 | 8/2001 |
| WO | WO 2012079688 A1 | 6/2012 |

\* cited by examiner

PNEUMATIC CIRCUIT FOR PASSENGER CAR PNEUMATIC SUSPENSION SYSTEM

CROSS REFERENCE TO RELATED APPLICATIONS

This application is a U.S. National Stage Application under 35 U.S.C. § 371 of International Application No. PCT/EP2015/001716 filed on Aug. 21, 2015, and claims benefit to German Patent Application Nos. DE 10 2014 012 680.3 filed on Aug. 22, 2014 and DE 10 2014 012 609.9 filed on Aug. 22, 2014. The International Application was published in German on Feb. 25, 2016 as WO 2016/026577 A1 under PCT Article 21(2).

FIELD

The invention relates to a compressed air supply installation for the operation of a pneumatic system, to a compressed air supply system, to a method for the operation of a compressed air supply system, and to a vehicle having a compressed air supply system

BACKGROUND

Compressed air supply installations are used in vehicles to supply air suspension systems with compressed air. Air suspension systems may also comprise ride-height control devices, which serve for adjusting the distance between the vehicle axle and the vehicle body. An air suspension system of a pneumatic system comprises a number of air bellows, which are pneumatically connected to a common line (gallery) and which raise the vehicle body as they are increasingly filled with air and correspondingly lower it as the filling decreases. As the distance between the vehicle axle and the vehicle body or the ground clearance increases, the spring travels become longer and even greater unevenness in the ground surface can be overcome without coming into contact with the vehicle body. Such systems are increasingly being used for preference in all-terrain vehicles and sport utility vehicles (SUVs).

It is desirable with high-performance vehicles, particularly in the case of SUVs, to provide the vehicle on the one hand with a relatively low ground clearance for high road speeds and on the other with a relatively high ground clearance for off-road use. It is furthermore desirable to alter the ground clearance as rapidly as possible, which increases the demands on the responsiveness, flexibility and reliability of a compressed air supply installation.

In order to ensure the long-term working of the compressed air supply installation, a main pneumatic line of the compressed air supply installation comprises an air drier, which serves to dry the compressed air. This prevents moisture collecting in the pneumatic system. Moisture can lead at relatively low temperatures to the formation of valve-damaging crystals and moreover to unwanted defects in the compressed air supply installation and in the pneumatic unit. An air drier comprises a desiccant, usually a granulate filling, through which the compressed air can flow, so that the granulate filling is able to adsorb moisture contained in the compressed air. An air drier may possibly be designed as a regenerative air drier. This can be done by causing the dried compressed air from the pneumatic unit, in particular an air suspension system, to flow through the granulate filling in each venting cycle—generally in a countercurrent flow but also sometimes in a concurrent flow, relative to the filling direction. A regeneration of the air drier is afforded substantially through an alternating pressure on the air drier, in which a pressure prevailing during the regeneration is regularly lower than during adsorption, in order to allow the granulate to give off moisture. For this purpose the venting valve arrangement may be opened, the regeneration capacity of the air drier regularly varying as a function of the pressure ratios and the alternating pressure amplitude in the compressed air supply installation. For such a so-called alternating pressure adsorption, also, it has proved desirable to make a compressed air supply installation flexible and at the same time reliable. The aim, in particular, is to allow a relatively rapid venting on the one hand whilst nevertheless affording a low air pressure (i.e. during regeneration) alternating pressure amplitude sufficiently high for regeneration of the air drier.

Various attempts have been made to design a pneumatic connection between an aforementioned compressed air feed and an aforementioned pneumatic unit. These take account of the basic functions of a compressed air supply installation in ventilating the pneumatic unit and venting the pneumatic unit. These still allow for improvement, however, with regard to the aforementioned need for a relatively rapid venting in conjunction with a low and/or maximum air pressure or alternating pressure amplitude which is nevertheless sufficient for regeneration of the air drier.

DE 35 42 974 A1 discloses a ride-height control device for vehicles, provided with air filters, which serves for setting a predefined distance of the vehicle cell from the vehicle axle as a function of the vehicle loading by filling or emptying the air springs. The device comprises a safety valve that can be controlled by the pressure in the air springs. In such an installation a regeneration of the air drier is possible by way of a restrictor and a non-return valve opening in the opposite direction to a filling direction. The compressed air supply installation in DE 35 42 974 A1 has long proved successful but is still capable of improvement. It has been shown that although the installation is advantageously suited to saving compressed air also in a regeneration of the air drier, by using the first non-return valve to separate the compressed air supply installation and the pneumatic system, the applicant's installation disclosed in DE 35 42 974 A1 has nevertheless proved limited in its scope, particularly for advanced applications which call for relatively flexible and rapid compressed air handling in a comparatively short space of time.

DE 10 2010 054 704 A1 describes a compressed air supply installation for the operation of a pneumatic unit, having an air feed and an air compressor for supplying a compressed air feed with compressed air. A venting line has a venting valve arrangement and a venting connection for discharging air and a compressed air supply line has an air drier and a compressed air connection for supplying the pneumatic unit with compressed air, wherein the air drier comprises a drying vessel containing a desiccant through which compressed air can flow. The compressed air supply installation provides for a solenoid valve arrangement as a directly controlled venting solenoid valve arrangement which, activated via a control line, allows direct control of the overall compressed air volume. The single valve of the solenoid valve arrangement allows a rapid and flexible venting of the pneumatic unit and the compressed air supply installation without the need for an additional control valve. This primarily affords a compact compressed air supply installation, but as an advantageous basis for improved acoustics and/or regeneration of an air drier this concept is still particularly open to improvement.

DE 10 2011 109 500 A1 discloses an inherently particularly advantageous compressed air supply installation, in which an isolating valve in a main pneumatic line is formed as a pneumatically releasable non-return valve. In a development a double relay piston may be provided, which can be subjected to pressure in such a way that the non-return valve can be released whilst at the same time actuating a venting valve.

SUMMARY

In an embodiment, the present invention provides a compressed air supply installation for the operation of a pneumatic system, the compressed air supply installation including a compressed air feed, a compressed air connection to a pneumatic unit, a venting connection, a main pneumatic line disposed between the compressed air feed and the compressed air connection, and a first venting line disposed between the compressed air connection and the venting connection, the first venting line including a venting valve including a first venting valve connection, a second venting valve connection, and a control connection pneumatically connected to a control valve by a pneumatic control relay line. The venting valve is closed between the first venting valve connection and the second venting valve connection to the venting connection in a first switching state of the venting valve and is opened between the first venting valve connection and the second venting valve connection to the venting connection in a second switching state of the venting valve. The control valve is closed between a control pressure input connection and a control pressure output connection to the control connection in a first switching state of the control valve and is opened between the control pressure input connection and the control pressure output connection to the control connection in a second switching state of the of the control valve in order to subject the control connection of the venting valve to pressure and to shift the venting valve from the first or second switching state of the venting valve into second or first switching state of the venting valve. The control valve is a 2/2-way directional control valve. The pneumatic control relay line is connected to the venting connection by an additional venting line in at least one of the first or second switching state of the venting valve.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
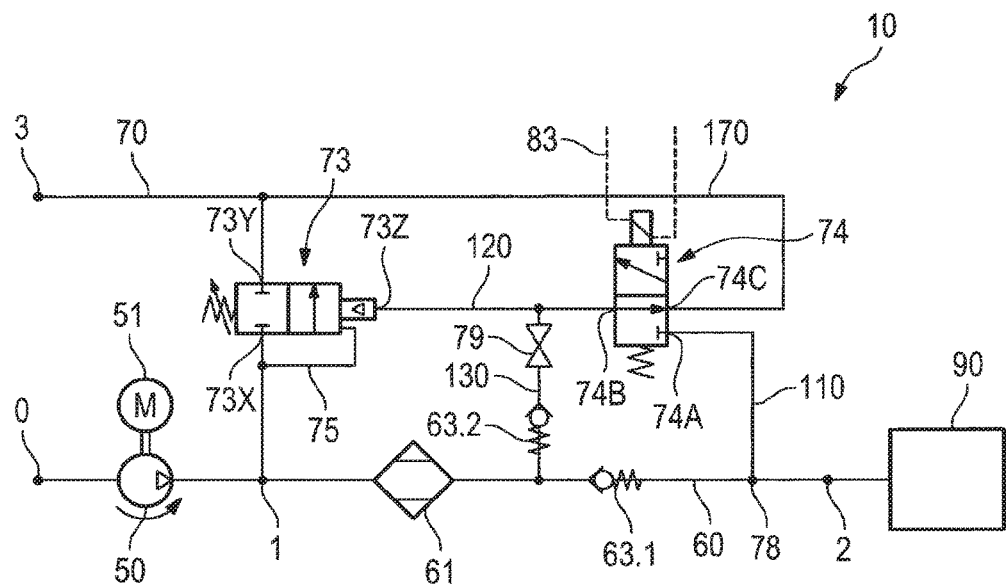
FIG. 1 shows a compressed air supply installation as is known, for example, from the state of the art.

Known compressed air supply installations can be improved in terms of power demand and/or acoustics. In particular it is apparent that the nominal diameters of a restrictor are limited with regard to the regeneration aspects of the air drier, which has effects on the rate of air flow of the compressed air supply installation and hence on its flexibility. On the other hand, a mere adjustment of nominal diameters has widely varying effects on the power demand and acoustics of a compressed air supply installation.

Although in a compressed air supply installation a gallery of the pneumatic unit can be closed off from the compressed air supply installation, thereby making it possible to switch a solenoid valve block component in the pneumatic unit without at the same time filling the volume of the air drier, the construction of such a compressed air supply installation can nevertheless be improved.

It is desirable to design a compressed air supply installation that simultaneously provides flexibility in switching and energy-saving with a high degree of performance control and/or reduced noise.

A compressed air supply installation and a method for the operation of a pneumatic unit are described herein that represent an improvement with respect to the current state of art. In particular, a device and a method are described herein for achieving an improved acoustic behavior. Moreover, embodiments of the invention described herein provide a reliable, flexible, and, where necessary, rapid mode of operation, wherein the compressed air supply installation and the method for the operation of the compressed air supply installation are embodied in a simplified manner.

According to an embodiment of the invention, a compressed air supply installation includes a compressed air feed, a compressed air connection to a pneumatic unit, and a venting connection or a further venting connection to the surroundings. A main pneumatic line is formed between the compressed air feed and the compressed air connection. A venting line including a venting valve connected via a first and a second venting valve connection is formed between the compressed air connection and the venting connection. The venting valve additionally includes a control connection, which is connected in pneumatic connection to a control valve by means of a pneumatic control relay line. The venting valve is closed between the first venting valve connection and the second venting valve connection to the venting connection in a first switching state and is opened between the first venting valve connection and the second venting valve connection to the venting connection in a second switching stated. The control valve is closed between a control pressure input connection and a control pressure output connection to the control connection in a first switching state and is opened between the control pressure input connection and the control pressure output connection to the control connection in a second switching states in order to subject the control connection of the venting valve to pressure and to shift the venting valve from the first or second switching state of the venting valve into the other respective switching state of the venting valve. The control valve is provided in the form of a 2/2-way directional control valve, wherein the pneumatic control relay line is connected to the venting connection and/or a further venting connection by an additional venting line in the first and/or the second switching state of the venting valve.

A compressed air supply system according to an embodiment of the invention includes a compressed air supply installation and a pneumatic unit, in particular an air suspension system of a vehicle, preferably an automobile, in particular including a gallery, which includes at least one branch line, pneumatically connected to the gallery, and having a bellows and/or a reservoir and a directional control valve arranged upstream of the bellows and/or the reservoir.

A method according to an embodiment of the invention includes ventilating a pneumatic unit, wherein a 2/2-way directional control valve is switched into a first switching state which is closed between a control pressure input connection and a control pressure output connection to a control connection in order to isolate a control relay line from pressure in a main pneumatic line. The method further includes venting of the pneumatic unit, wherein the 2/2-way directional control valve is switched into a second switching state which is opened between the control pressure input connection and the control pressure output connection to the control connection of the venting valve in order to subject the control relay line to pressure, wherein the control relay line in the first and/or second switching state of the control valve is connected via an additional venting line to the venting connection and/or the further venting connection.

In the venting of a volume under high pressure, for example an air drier or a pneumatic unit, a high acoustic nuisance, in the form of a venting report or the like, is imposed on the environment, due to an excessively rapid fall in pressure. An excessively rapid fall in pressure and/or a high initial pressure amplitude are the prime causes of a high noise level. Factors influencing noise levels are substantially influenced by design data and configurations, primarily of the venting valve.

Embodiments of the invention take advantage of pneumatic control of the venting valve picking up the control pressure. This concept is in some aspects better, but at any rate in some aspects better suited as an alternative, since at least the control variable is made to vary as a function of a magnitude of pressure to be vented. Embodiments of the invention take advantage of the fact that a control pressure can not only be used for pneumatically controlling the venting valve, but additionally can advantageously be used in order to prolong the initial venting phase of the venting valve, thereby avoiding an explosive initial venting causing a venting report.

Accordingly, embodiments of the invention utilize a control relay line that is, in both a first and a second switching state of the venting valve and/or the control valve, pneumatically connected to a venting connection and/or a further venting connection by an additional venting line, preferably by a restricted additional venting line.

An air supply installation according to an embodiment of the invention provides an additional restrictor arranged in the additional venting line. In this embodiment an additional restrictor or an additional restrictor valve is provided as a local constriction in the additional venting line, in particular a local constriction of the flow cross section of the additional venting line. This reduces the pressure of the compressed air flowing through. In an embodiment the additional restrictor may be a restrictor with open or closed-loop control.

In an appropriate development of a compressed air supply installation according to an embodiment of the invention, the additional restrictor may have a diameter of less than one millimeter and greater than zero millimeters. Here the additional restrictor is embodied as a controlled or uncontrolled restrictor and comprises a local constriction having a maximum diameter of 1 millimeter. The additional restrictor here then preferably has a diameter which is smaller than that of a first restrictor, which is arranged in the main pneumatic line, and via which the compressed air supply installation is vented—with the venting valve opened. It may be, for example, that the additional restrictor has a diameter of 0.9 mm and the first restrictor in the main pneumatic line has a diameter of 1.2 mm.

In a preferred development of a compressed air supply installation according to an embodiment of the invention, the additional venting line is pneumatically connected to a portion of the venting line between the second venting valve connection and the venting connection and/or to the further venting connection. In this advantageous development of the compressed air supply installation the additional venting line is, in particular, pneumatically connected to the venting connection and/or the further venting connection regardless of the switching state of the venting valve. The additional venting line is therefore always pneumatically connected to the venting connection and/or the further venting connection, that is to say open to a flow, so that regardless of the switching state of the venting valve the additional venting line and the control relay line—pneumatically connected to the additional venting line—can be vented even when the venting valve is closed. This is important, in particular, following a venting process of the pneumatic unit, since otherwise the compressed air/the pressure cannot be led off from the control relay line.

In a preferred development of a compressed air supply installation according to an embodiment of the invention, a pneumatic control relay line between the control pressure output connection of the control valve and the control connection of the venting valve is embodied as a pneumatic control relay line which can be subjected to a control pressure, in particular as a relay piston control line for a relay piston of the venting valve. Here the venting valve comprises a relay piston which, subjected to a control pressure via the control relay line, when pressurized shifts the venting valve from a first, closed valve position—held by a valve spring—into a second valve position—actuated by the control pressure—against the spring force of the valve spring. For this purpose the control valve is shifted from the first switching state into the second switching state, so that the control relay line is subjected to (control) pressure and the venting valve is opened, as described above.

In a development of a compressed air supply installation according to an embodiment of the invention, the additional venting line may be formed as an opening in the relay piston or in the venting valve housing of the venting valve. In this development an opening, through which the compressed air can flow to or from the venting connection and/or the further venting connection, is provided in the relay piston or in the venting valve housing of the venting valve. An additional venting line formed in this way is particularly easy to implement in design terms and requires only minimal intervention in an existing system, particularly in an existing compressed air supply installation.

In a development of a compressed air supply installation according to an embodiment of the invention, the opening is preferably formed as a bore in the relay piston of the venting valve. Here the opening, which forms the additional venting line, is formed as a bore in the relay piston of the venting valve. This development is particularly easy to implement in design terms.

A preferred development relates to a compressed air supply installation in which a seal is provided, which seals off and closes the opening or the bore in the first or second switching state of the venting valve. In this development the additional venting line is closed and sealed while ever the relay piston is situated in the first or second switching state of the venting valve, in which the venting valve is opened for venting of the pneumatic unit. Here the seal—through the displacement of the relay piston—closes an inlet of the additional venting line. Once the venting valve has been returned to the closed switching state, in particular through a displacement of the relay piston into the closed position, the additional venting line is opened again, so that the additional venting line itself and the pneumatically connected control relay line can also be vented.

An advantageous development relates to a compressed air supply installation in which the opening is formed as an aperture in the venting valve housing of the venting valve, wherein the aperture is formed, in particular, over a partial range of the valve lift of the relay piston of the venting valve.

An especially advantageous development relates to a compressed air supply installation in which the control valve is embodied as a solenoid control valve. Here the control valve is preferably embodied as a valve which can be actuated by means of a solenoid. Here the control valve can more preferably be activated by a control signal, for example in the form of a voltage and/or current signal, relayed via an electrical control line to a coil (solenoid) of the control valve, so that the control valve can shift from the first switching state, which is closed between the control pressure input connection and the control pressure output connection, into the second switching state, which is opened between the control pressure input connection and the control pressure output connection.

In a development of a compressed air supply installation according to an embodiment of the invention, the first switching state of the control valve is preferably an unenergized switching state and the second switching state an energized switching state. Without limiting the invention, however, the first switching state of the control valve may also be an energized state and the second switching state of the control valve an unenergized switching state.

In a preferred variant of some developments the additional venting line is embodied as a feedback line, wherein the feedback line connects to the pneumatic control relay line and to a second control connection of the venting valve.

According to a variant, in the case of a venting connection of the venting valve which is pneumatically connected to the second control connection, particular provision is made for the connection of yet a further venting line, which is pneumatically connected to the venting connection and/or the further venting connection.

In a variant the second control connection is more preferably designed to receive a second control pressure fraction, which acts in addition to a first control pressure fraction of the first control connection.

In a variant, the second control connection is embodied as a counter-control connection, which is designed to receive a second control pressure fraction, which acts in addition to a first control pressure fraction of the first control connection and for a limited time and in the opposite direction to a first control pressure fraction of the first control connection.

The additional venting line can be, in particular, pneumatically connected as a feedback line to a venting rear space of the venting valve and to the venting connection and/or to the further venting connection, wherein yet a further venting line connects by yet a further second venting branch connection to the venting line. Preferably connected to the venting rear space, particularly in a venting connection of the venting valve, is yet a further venting line, which connects by yet a further second venting branch connection to the venting line, between the venting valve and the first venting branch connection.

In a compressed air supply installation according to an embodiment of the invention, the venting valve is preferably formed by means of a relay piston which can be subjected to control pressure, wherein the control pressure can be controlled by the control valve, and the relay piston is designed for switching of the venting valve, particularly into an opened or closed state, wherein the venting valve is a pneumatically actuated 2/2-way directional control valve.

Here the relay piston has a first control face facing a control chamber, and a second control face facing a venting rear space, wherein the first and the second control face are arranged for opposing reception of the first control pressure fraction and of the second control pressure fraction, wherein the first and second control pressure fractions are derived from the relay piston control line.

In a variant, a relay piston of the venting valve is bilaterally subjected to pressure on opposite sides of the relay piston, with a pressure variable derived from the control pressure, that is to say a first control face for receiving a first control pressure fraction variable of the control pressure fraction and a second control face for receiving a second control pressure fraction variable of the control pressure fraction, which are opposed to one another; although this is confined to a limited time span in the overall venting process, preferably at the beginning of the venting process.

Figuratively described, the relay piston becomes bilateral, in particular briefly for an initial phase, as it were, a bilaterally pressurized cylinder, so that the resulting delay when the relay piston opens in the venting process leads to redistribution of the incident control air commensurate with demand, resulting in a slower opening process of the air drier. The delay is sufficient to significantly dampen any venting report and to reduce the overall noise backdrop in a venting process. In particular, the yet further venting line is designed for venting the venting rear space of the venting valve when the relay piston is actuated, and the yet further venting line is restricted in the passage of compressed air by means of a third restrictor, wherein a movement of the relay piston when actuated is also damped owing to the thereby defined passage of compressed air from the venting rear space.

FIG. 1 shows a schematic representation of a compressed air supply installation 10 as known from the state of the art, for example. The compressed air supply installation 10 represented is connected to a pneumatic unit 90. Together, the compressed air supply installation 10 and the pneumatic unit 90 form a pneumatic system.

FIG. 1 further shows a compressed air supply installation 10, which comprises a compressed air feed 1 and a compressed air connection 2 to the pneumatic unit 90. The compressed air feed 1 here is pneumatically connected to an air feed connection 0 via an intake line via an air compressor 50 driven by a motor 51, wherein the motor 51 drives a compressor of an air compressor 50.

A first pneumatic connection is formed with a main pneumatic line 60 between the compressed air feed 1 and the compressed air connection 2 to the pneumatic unit 90. Also provided in the main pneumatic line 60 is an air drier 61 for cleaning and drying the compressed air.

The compressed air supply installation 10 further comprises a controllable venting valve 73 and an electrically activated control valve 74, which is embodied in the form of a 3/2-way directional control valve. The control valve 74 is formed with three connections 74A, 74B and 74C, that is to say a control pressure input connection 74A, a control pressure output connection 74B and a venting connection 74C. Here the control valve 74 is pneumatically connected to the control pressure output connection 74B via a pneumatic control line 110, to the main pneumatic line 60 and via the venting connection 74C to the venting line 70. In addition the control valve 74 is pneumatically connected to the venting valve 73 via the control pressure input connection 74A of the control valve 74 via a control relay line 120.

The 3/2-way directional control valve 74 has two switching states, that is to say a first, unenergized switching state, which is closed between the control pressure input connection 74A and the control pressure output connection 74B, and opened between the control pressure input connection 74A and the venting connection 74C, and a second, energized switching state, which is opened between the control pressure input connection 74A and the control pressure output connection 74B, and closed between the control pressure input connection 74A and the venting connection 74C. The control valve 74 may be activated by a control signal, in the form of a voltage and/or current signal relayed via an electrical control line 83 to a coil, thus shifting the control valve 74 from the first into the second switching state.

When activated—by means of a voltage and/or current signal—the control valve 74 is shifted from the first, unenergized switching state into the second switching state, which is opened between the control pressure input connection 74A and the control pressure output connection 74B, so that control pressure is derived from the main pneumatic line 60 via the control line 110 and the pneumatic control relay line 120 and is relayed as pressure for controlling the controllable venting valve 73, in particular for controlling a relay piston of the venting valve 73. The control pressure serves to actuate and in particular to displace the relay piston of the venting valve 73, so that the venting valve 73 is opened.

The venting valve 73 has a first switching state, which via the venting line 170 to the venting connection 3 is closed between a first venting valve connection 73X and a second venting valve connection 73Y; and a second switching state of the venting valve 73, which via the venting line 170 to the venting connection 3 is opened between the first venting valve connection 73X and the second venting valve connection 73Y.

By shifting the control valve 74 from the first into the second switching state, that is to say from the first, unenergized, closed state (between the control pressure input connection 74A and the control pressure output connection 74B) into the second, energized opened state, the venting valve 73 is shifted from the first to the second state, so that the compressed air feed 1 and the venting connection 3 are then pneumatically connected via the opened venting valve 73, and the compressed air supply installation 10, in particular the pneumatic unit 90, can be vented.

Once the pneumatic unit 90 has been vented, the control valve 74 is returned from the second into the first switching state. In the first switching state of the control valve, which is opened between the control pressure input connection 74A and the venting connection 74C, the control pressure in the control relay line 120 can be vented or led off via the further venting line 170.

Figure 2:
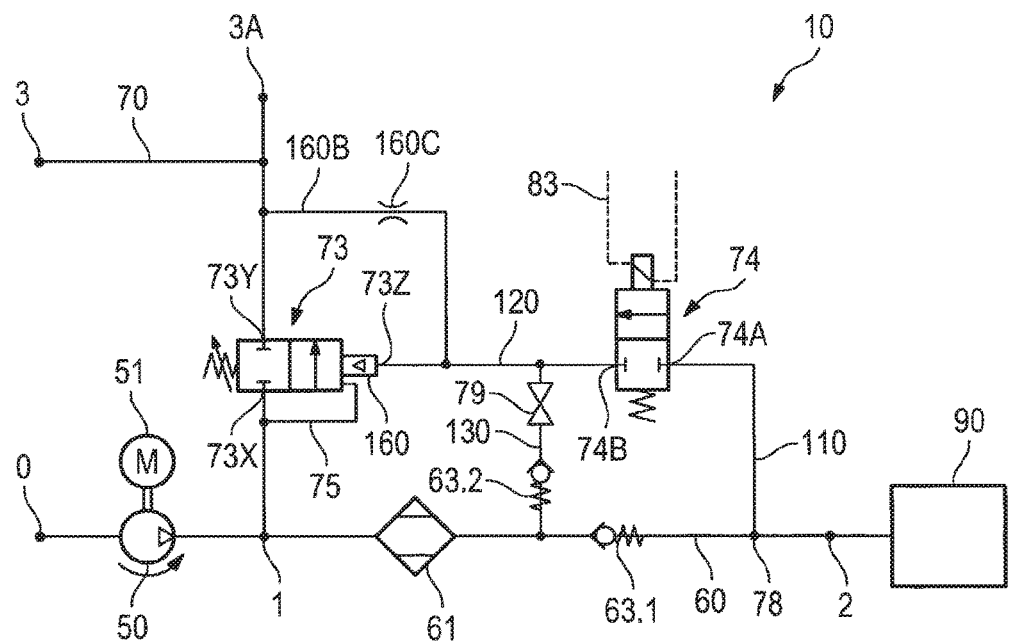
FIG. 2 shows a compressed air supply system according to an embodiment of the invention.

FIG. 2 shows a simplified, schematic representation of a preferred embodiment of the compressed air supply installation 10 according to the invention, which is connected to a pneumatic unit 90. Together, the compressed air supply installation 10 and the pneumatic unit 90 form a pneumatic system. The compressed air supply installation 10 represented serves for the operation of the pneumatic unit 90, but in contrast to the known state of the art (see FIG. 1) is not formed with a 3/2-way directional control valve, but with a 2/2-way directional control valve 74 and a restricted additional venting line 160B.

The exemplary embodiment for a compressed air supply installation 10 shown in FIG. 2 comprises a compressed air feed 1, a compressed air connection 2 and a venting connection 3. A main pneumatic line 60 is furthermore formed between the compressed air feed 1 and the compressed air connection 2, and a venting line 70 between the compressed air connection 2 and the venting connection 3.

A first pneumatic connection is formed with a main pneumatic line 60 between the compressed air feed 1 and the compressed air connection 2 to the pneumatic unit 90. An air drier 61 and an isolating valve, which is formed as a first pneumatic non-return valve 63.1, are arranged in the main pneumatic line 60.

The main pneumatic line 60 and the venting line 70 are pneumatically connected to one another by means of a venting valve 73 and a corresponding pneumatic connection. The main pneumatic line 60 here is pneumatically connected to the venting valve 73 via a first venting valve connection 73X on the venting valve 73, and the venting line 70 via a second venting valve connection 73Y on the venting valve 73.

In addition, the venting valve 73 comprises a control connection 73Z, which is pneumatically connected to the control valve 74 by means of a pneumatic control relay line 120. The venting valve 73 here is additionally provided with a pressure limiter 75, wherein the pressure limiter 75 limits the control pressure on the control connection 73Z of the venting valve 73.

The control valve 74 is embodied in the form of a 2/2-way directional control valve, which (here) in a first, unenergized switching state is closed between a control pressure input connection 74A and a control pressure output connection 74B to the control connection 73Z, and in a second energized switching state is opened between the control pressure input connection 74A and the control pressure output connection 74B to the control connection 73Z.

The compressed air supply installation 10 further comprises a restricted additional venting line 160B, wherein the additional venting line 160B is restricted by means of an additional restrictor 160C. The additional restrictor 160C or the additional restrictor valve is a local constriction in the additional venting line 160B, in particular a local constriction of the flow cross section of the additional venting line 160B. This reduces the pressure of the compressed air flowing through. In a development not shown, the additional restrictor 160C may also be embodied as an adjustable restrictor. The additional restrictor 160C preferably comprises a local constriction having a maximum diameter of 1 millimeter. The additional restrictor 160 C preferably has a diameter which is smaller than that of a first restrictor (not shown), which is arranged in the main pneumatic line 60, and via which (first restrictor) the compressed air supply installation is vented—when the venting valve is opened. It may be, for example that the additional restrictor 160C has a diameter of 0.9 mm and the first restrictor in the main pneumatic line 60 has a diameter of 1.2 mm.

The restricted additional venting line 160B serves—in the first and/or second switching state of the venting valve 73 (depending on the embodiment)—for pneumatically connecting the pneumatic control relay line 120 to the venting line 70, so that the pneumatic control relay line 120 is connected by means of the additional venting line 160B to the venting connection 3 and/or a further venting connection 3A. The restricted additional venting line 160B here is opened both in the first and also in the second switching state of the venting valve 73.

The pneumatic control relay line 120, which is formed between the control pressure output connection 74B of the control valve 74 and the control connection 73Z of the venting valve 73, is here formed as a pneumatic control relay line 120 which can be subjected to control pressure, in particular as a relay piston control line for a relay piston 160 of the venting valve 73.

The control valve 74 can be activated by a control signal, in the form of a voltage and/or current signal relayed via an electronic control line 83 to the coil of the control valve 74. Here the control valve is shifted from the first switching state, which is closed between the control pressure input connection 74A and the control pressure output connection 74B to the control connection 73Z of the venting valve 73, into the second switching state, which is opened between the control pressure input connection 74A and the control pressure output connection 74B to the control connection 73Z of the venting valve 73. In the second switching state of the control valve 74 the control relay line 120 is subjected via the pneumatic control line 110 to compressed air from the main pneumatic line 60, in order to supply the control connection 73Z of the venting valve 73 with pressure and to shift the venting valve 73 from a first or second, closed switching state of the venting valve 73 into the other, respective switching state of the venting valve 73. To put it another way, activation of the control valve 74 can serve (indirectly) to open the venting valve 73 for venting of the pneumatic unit 90.

The compressed air supply installation furthermore comprises a further pneumatic control relay venting line 130, which pneumatically connects the main pneumatic line 60 to the pneumatic control relay line 120. A shut-off valve 79 or a restrictor and a second non-return valve 63.2 is arranged in the further pneumatic control relay venting line 130 between the main pneumatic line 60 and the pneumatic control relay line 120. The preferred embodiment of the component denoted as a shut-off valve 79 in FIG. 2 and the further FIGS. 3 to 7E is a restrictor having a constant or adjustable cross section, as is also shown in FIGS. 8 to 12 described below.

Figure 3:
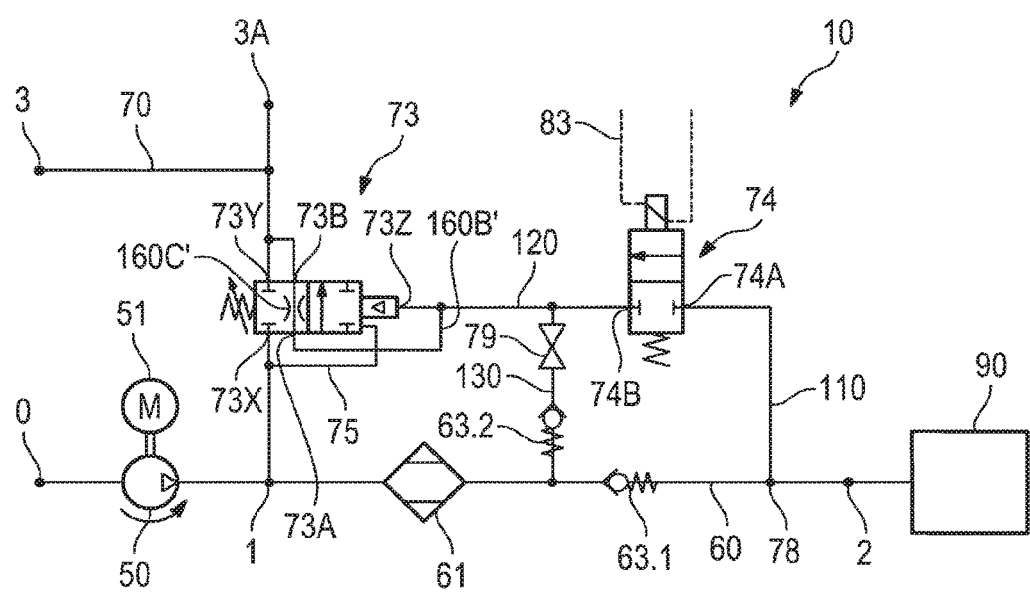
FIG. 3 shows a compressed air supply system according to an embodiment of the invention.

FIG. 3 shows a further embodiment of the compressed air supply installation, which substantially corresponds to the exemplary embodiment represented in FIG. 2. The difference compared to the embodiment shown in FIG. 2 is that the further pneumatic additional venting line 160B'—restricted by an additional restrictor 160C'—is led via the venting valve 73. Here the additional venting line 160B' is pneumatically connected to the control relay line 120 via a first additional venting valve connection 73A, and to the venting connection 3 and/or a further venting connection (not shown) via a second additional venting valve connection 73B. In a preferred development form the additional venting line 160B' is embodied in the form of an opening in the relay piston or in the housing of the venting valve 73. Here compressed air can then flow or be fed to the venting connection 3 and/or the further venting connection either through the opening in the relay piston or via the opening in the venting valve housing of the venting valve. An additional venting line 160W formed in this way is particularly easy to implement in design terms and requires only minimal design intervention in an existing system, particularly in an existing compressed air supply installation. The opening, which forms the additional venting line, is preferably embodied in the form of a bore in the relay piston or an aperture in the housing of the venting valve.

Figure 4:
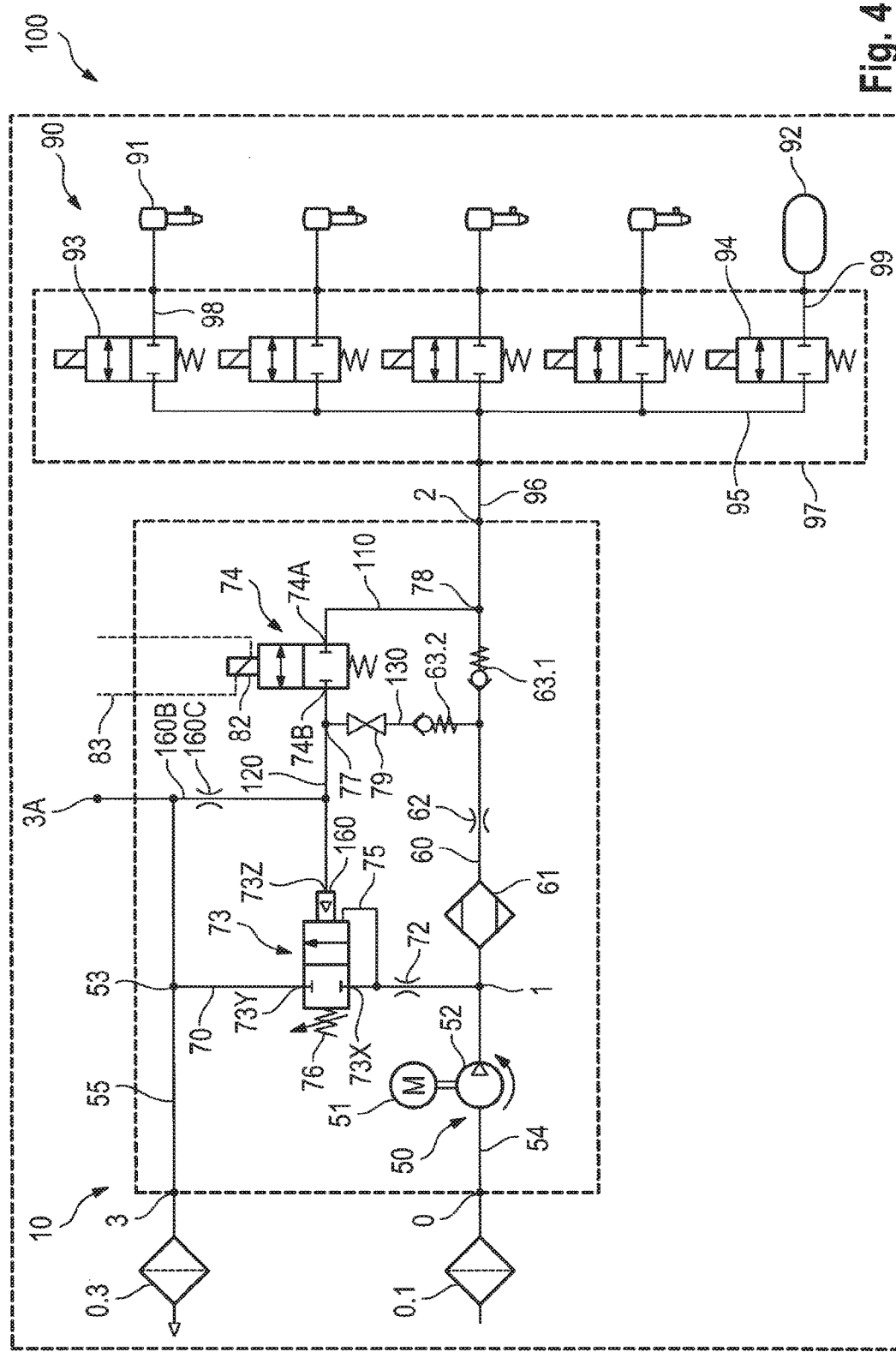
FIG. 4 shows a compressed air supply system according to an embodiment of the invention.

FIG. 4 shows a schematic representation of a compressed air supply system having a compressed air supply installation 10 and a pneumatic unit 90 in the form of an air suspension system. The air suspension system in this case comprises a total of four so-called bellows 91, which are each assigned to a wheel of a vehicle (not shown) and form an air spring of the vehicle. In addition the air suspension system comprises a reservoir 92 for storing rapidly available compressed air for the bellows 91. A solenoid valve 93, which in each case serves as ride-height control valve for opening or closing an air spring formed with a bellows 91, is arranged upstream of each of the bellows 91 in a spring branch line 98. The solenoid valves 93 in the spring branch lines 98 are embodied as 2/2-way directional control valves. A solenoid valve 94 in the form of a further 2/2-way directional control valve and serving as reservoir valve is arranged upstream of a reservoir 92 in a reservoir branch line 99. The solenoid valves 93, 94 are connected by means of the spring and reservoir branch lines 98, 99 to a common collecting line, a gallery 95—forming pneumatic line. The gallery 95 is pneumatically connected to a compressed air connection 2 of the compressed air supply installation 10 via a further pneumatic line 96 for forming a pneumatic connection. Here the solenoid valves 93, 94 are arranged in a valve block 97 with five valves. The solenoid valves 93, 94 are shown in an unenergized state in FIG. 4, that is to say the solenoid valves 93, 94 are formed as normally closed solenoid valves. Other modified embodiments, not shown here, may implement a different arrangement of the solenoid valves 93, 94—it is also possible to use fewer solenoid valves in the valve block.

In particular a non-return valve, hereinafter described as an isolating valve, may be arranged in one embodiment (not shown here) of the compressed air supply installation 10. An isolating valve may also be arranged in the pneumatic unit 90, for example also in the valve block 97. Similarly the pneumatic unit 90 may comprise a voltage/pressure sensor, not represented in further detail here, which in an additional branch line, not represented here, may be connected to the gallery 95, so that a pressure in the gallery 95 of the pneumatic unit 90 can be measured via the voltage/pressure sensor.

The compressed air supply installation 10 serves for operation of the pneumatic unit 90. For this purpose the compressed air supply installation 10 comprises a compressed air feed 1 and a compressed air connection 2 to the pneumatic unit 90. The compressed air feed 1 here is pneumatically connected to an air feed 0, an air filter 0.1 arranged upstream of the air feed 0 and—via an intake line 54 or similar pneumatic connection—to an air compressor 50, arranged downstream of the air feed 0 and driven by a motor 51 (M), wherein the motor 51 (M) drives a compressor 52 of the air compressor 50.

Here a first pneumatic connection is formed with a main pneumatic line 60 between the compressed air feed 1 and the compressed air connection 2, and connects on the one hand to the compressed air feed connection of the compressed air feed 1 and on the other to the compressed air connection 2 and the further pneumatic line 96 to form pneumatic connection. An air drier 61 and a first restrictor 62 are arranged in the main pneumatic line 60. Also arranged in the main pneumatic line 60 is an isolating valve, which is embodied in the form of a first pneumatic non-return valve 63.1. This may preferably also be embodied as a pneumatically releasable non-return valve.

The compressed air supply installation 10 further comprises a second pneumatic connection, that is to say a venting line 70, pneumatically connected to the main pneumatic line 60 and a venting connection 3 and further filter 0.3 and/or a silencer. Here the venting line 70 is connected to the main pneumatic line 60 at the compressed air feed connection of the compressed air feed 1. In the direction of the venting connection 3, a second restrictor 72 and a controllable venting valve 73 are arranged in the venting line 70. The venting valve 73 arranged in the second pneumatic connection formed by the venting line 70 is embodied as a 3/2-way directional control valve.

The controllable venting valve 73 is embodied as an indirectly switched relay valve. The control valve 74 can be activated by a control signal, in the form of a voltage and/or current signal relayed via an electronic control line 83 to a coil 82 of the control valve 74, so that a force acts on a magnet armature interacting with the piston of the control valve 74 or forming the latter. When activated, the control valve 74 may be shifted from the normally closed position shown into a pneumatically opened position, in which a pressure derived via a pneumatic control line 110—here at the main branch connection 78 from the main pneumatic line 60—is relayed to the relay valve for pneumatic control of the controllable venting valve 73.

Here the controllable venting valve 73 is additionally provided with a pressure limiter 75. By way of a further pneumatic control line upstream of the venting valve 73—specifically between the second restrictor 72 and the venting valve 73—the pressure limiter 75 taps a pressure which, if it exceeds a pressure threshold, lifts the piston of the venting valve 73 off from the valve seat against the force of an adjustable spring 76—that is to say it brings the controllable venting valve 73 into the opened position even without activation via the control valve 74. This serves to prevent an excessively high pressure accidently occurring in the pneumatic system 100.

The control valve 74, which is embodied in the form of a 2/2-way directional control valve, comprises two connections, that is to say a control pressure input connection 74A and the control pressure output connection 74B and here in the normally closed state disconnects the control line 110 and a control relay line 120 to the relay piston 160 of the venting valve 73. The control relay line 120 is pneumatically connected to the venting connection 3 and/or a further venting connection 3A via an additional venting line 160B.

The further additional venting line 160B comprises an additional restrictor 160C, wherein the additional restrictor 160C has a maximum diameter 1 mm. The additional restrictor 160C preferably has a diameter which is smaller than the diameter of a first restrictor 62, which is arranged in the main pneumatic line 60.

A further pneumatic control relay venting line 130 is furthermore provided in the compressed air supply installation 10, between the main pneumatic line 60 and the control relay line 120, and is connected at the branch connection 77 to the control relay line 120. A shut-off valve 79 or a restrictor and a further non-return valve 63.2 are arranged in the further pneumatic control relay venting line 130.

Given a control pressure derived from the main pneumatic line 60 or from the further pneumatic line 96 via the pneumatic control line 110, the non-return valve 63.2 can be released via the control valve 74 under a pressure applied to the pneumatic control relay venting line 130—that is to say by shifting the control valve 74 into the opened state. Shifting the control valve 74 into the opened state also leads to a shifting of the venting valve 73 from the closed position into an opened position and via the pneumatic control relay venting line 130, the non-return valve 63.2, the first restrictor 62, the drier 61, the second restrictor 72 and finally the opened venting valve 73 leads to venting of the pneumatic unit 90. This also leads separately to a bilateral pneumatic opening of the air drier 61. In operation this operating position may be used to vent the pneumatic unit 90 and at the same time to regenerate the air drier 61.

The operating position of the compressed air supply installation 10 shown in FIG. 4 primarily serves, with a flow through the non-return valve 63.1, for filling the pneumatic unit 90 via the main pneumatic line 60. The solenoid valve 93 arranged upstream of the bellows 91 and/or the solenoid valve 94 arranged upstream of the reservoir 92 are brought into an opened position Nevertheless, with the solenoid valves 93, 94 in the pneumatic unit 90 in the closed position, the non-return valve 63.1 here allows an operating position of the pneumatic unit 90 isolated from the compressed air supply installation 10. In other words, a cross-connection of the bellows 91 (for example in the off-road operation of a vehicle 1000), a filling of the bellows 91 from the reservoir 92 or a pressure measurement in the pneumatic unit 90 via the gallery 95 can be undertaken without subjecting the compressed air supply installation 10 to pressure. In particular, shutting the non-return valve 63.1 off from the compressed air connection 2 to the compressed air feed 1 and closing the control valve 74 protect the air drier 61 from being unnecessarily subjected to compressed air.

It has been recognized in the embodiment shown here that subjecting the air drier 61 to compressed air is not advantageous in every operating position of the pneumatic unit 90. Rather it is advantageous for an effective and rapid regeneration of the air driers 61 if this is done solely in the case of a venting of the pneumatic unit 90; that is to say in a venting direction from the compressed air connection 2 to the compressed air feed connection of the compressed air feed and then to the venting connection 3.

For this purpose the control valve 74 is brought from the first switching state into the second switching state, so that the venting valve 73 opens. A venting of the pneumatic unit 90 can ensue via the pneumatic control line 110, the control valve 74, the pneumatic control relay venting line 130, the non-return valve 63.2, the first restrictor 62, regenerating the air drier 61, and via the second restrictor 72 and the opened venting valve 73 to the venting connection 3.

In this case the venting valve 73 is provided with a relay piston 160, which is designed to be subjected to a control pressure in order, when subjected to that pressure, to shift the venting valve 73 from a first, closed valve position, in which it is free of control pressure and held by the valve spring 76, into a second valve position actuated by the control pressure against the compressive force of the valve spring 76.

Figure 5:
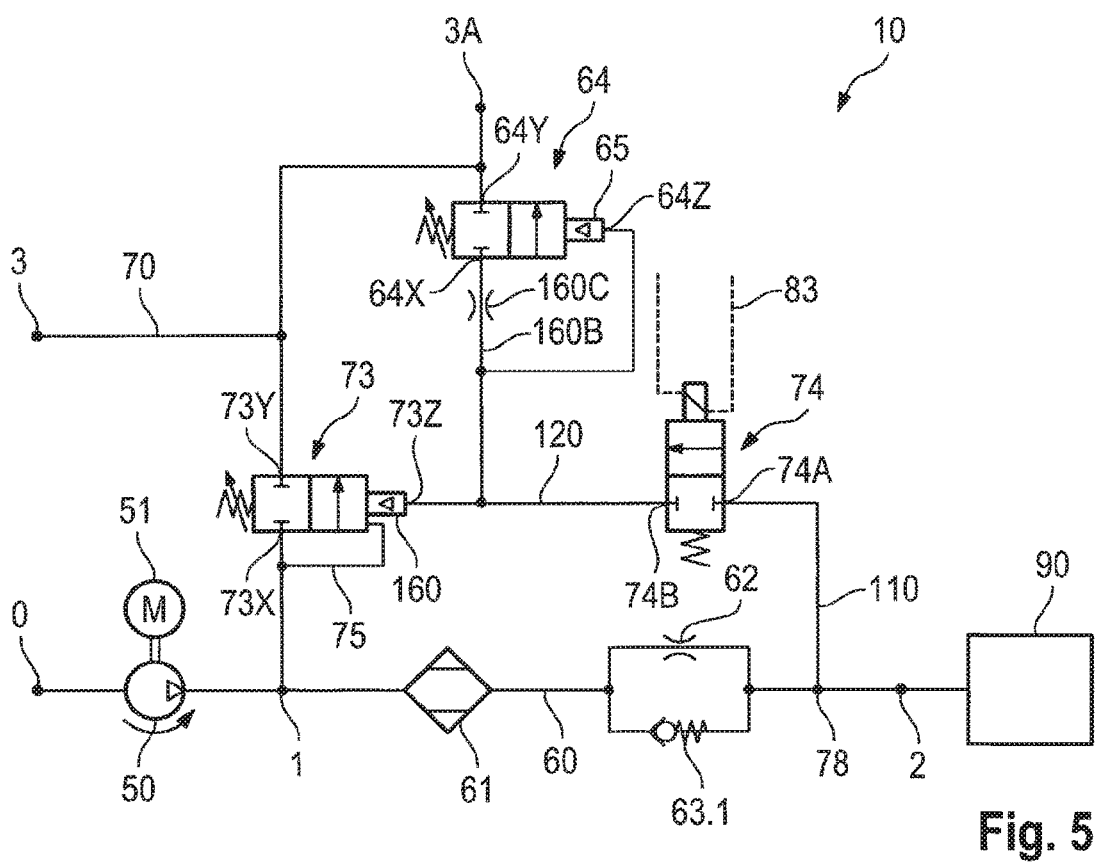
FIG. 5 shows a compressed air supply system according to an embodiment of the invention.

FIG. 5 shows an even more preferable embodiment of the compressed air supply installation 10, as has already been substantially represented and described in FIGS. 2 to 4, showing a preferred development of the additional venting line 160B. The same reference numerals (as in FIGS. 2 to 4) are used for identical features.

The compressed air supply installation shown in FIG. 5 differs from the embodiments of the compressed air supply installation shown in FIGS. 2 to 4 in that a further additional venting valve 64 is provided in the restricted additional venting line 160B, wherein the additional venting line 160B is restricted by means of an additional restrictor 160C. In addition, the first restrictor 62 arranged in the main pneumatic line 60 and the pneumatic non-return valve 63.1 are connected in parallel.

The additional venting valve 64 is embodied in the form of a 3/2-way directional control valve and comprises a total of three connections, that is to say a first connection 64X, a second connection 64Y and a third connection 64Z, wherein the third connection 64Z is embodied as a relay piston control connection for the additional venting valve 64.

The additional venting valve 64 has a first switching state, which is closed between the first connection 64X and the second connection 64Y, and a second switching state, which is opened between the first connection 64X and the second connection 64Y to the venting connection 3 and/or the further venting connection 3A.

If the additional venting line 160B is now subjected to pressure, for example through shifting of the control valve 74 from the first, unenergized, closed switching state into the second, energized, opened switching state, not only the control connection 73 Z of the venting valve 73 but also the relay piston 65 of the additional venting valve 64 is subjected to pressure, so that the additional venting valve 64 shifts from first, closed switching state into the second, opened switching state, in which the restricted additional venting line 160B is pneumatically connected to the venting connection 3 and/or a further venting connection 3A.

Moreover, the mode of operation of the compressed air supply installation shown in FIG. 5 is substantially similar to the embodiments of a compressed air supply system represented in FIGS. 2 to 4.

Figure 6A:
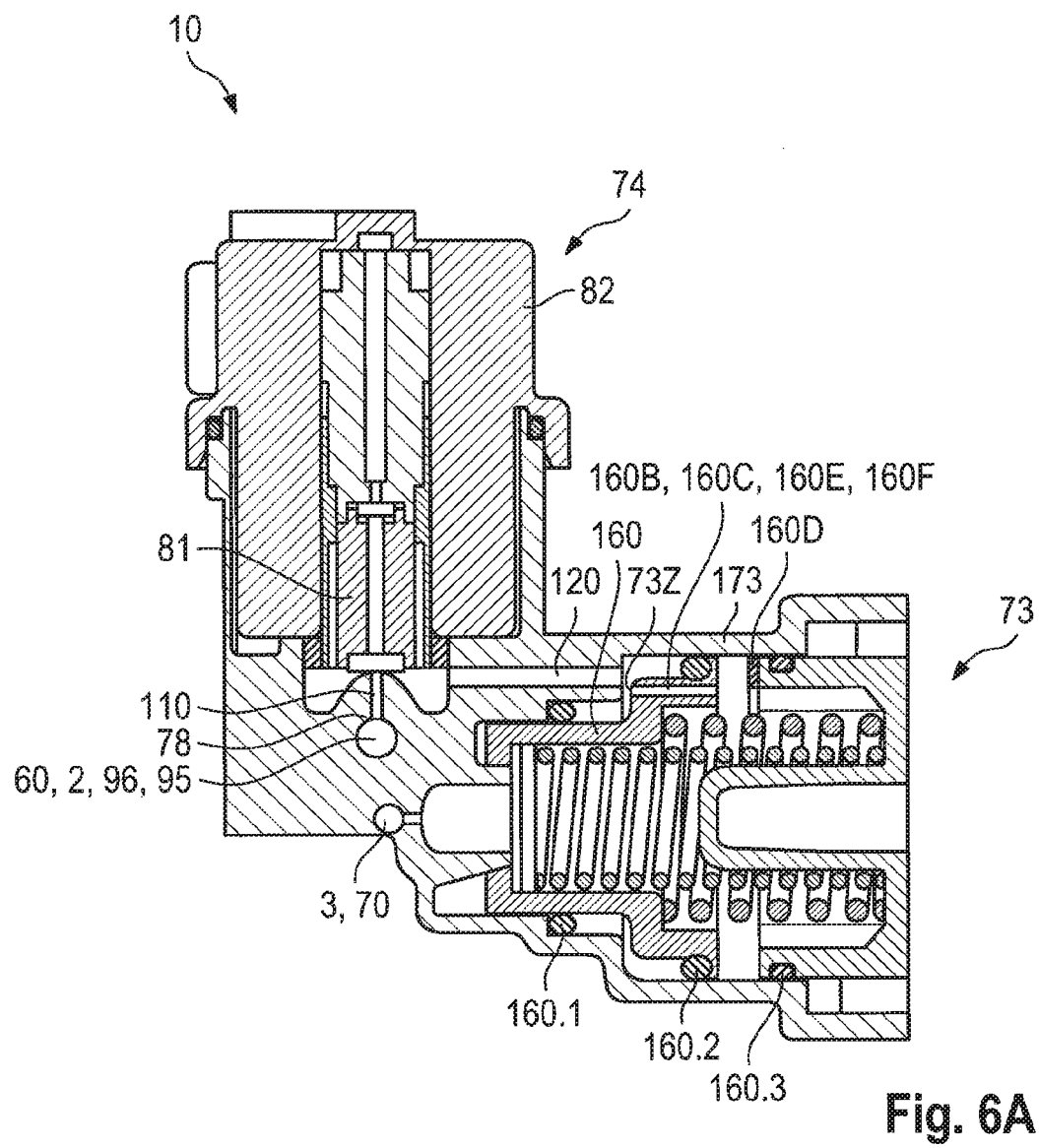
FIG. 6A shows a schematic representation of a valve arrangement according to an embodiment of the invention.

FIG. 6A shows a possible embodiment of a compressed air supply installation 10 for controlling a pneumatic unit 90 (not shown). The pneumatic unit 90 is connected to the main pneumatic line 60 via the connection 2, for example.

An arrangement having a control valve 74, which is embodied in the form of a 2/2-way directional control valve, and a venting valve 73, which is embodied in the form of a 3/2-way directional control valve, is shown here. Both valves, that is to say the control valve 74 and the venting valve 73, are arranged in a common (valve) housing 173 and are shown here in the closed switching state.

The venting valve 73 is embodied as a controllable relay valve having a relay piston 160. The control valve 74 can be activated via an electronic control line (not shown) to a coil 82 of the control valve 74, so that a magnetic force acts on a piston 81 of the control valve 74 and the piston 81 moves upwards. When activated, the control valve 74 can be shifted from the normally closed position shown (i.e. piston 81 in the lower position) into a pneumatically opened position (i.e. piston 81 in the upper position), in which a pressure derived via a pneumatic control line 110—here at the main branch connection 78 from the main pneumatic line 60—is relayed to the relay valve via a control relay line 120 for pneumatically controlling the controllable venting valve 73.

The control relay line 120 here connects the control valve 74 to the venting valve 73, in particular to the control connection 73Z and the relay piston 160 of the venting valve 73.

A restricted additional venting line 160B is furthermore provided, wherein the additional venting line 160B is formed by means of a restrictor 160C (not shown). The restrictor 160C, for example, may be a local constriction in the additional venting line 160B, in particular a local constriction of the flow cross section of the additional venting line 160B. This reduces the pressure in the compressed air flowing through. In one development (not shown) the additional restrictor 160C may also be embodied as an adjustable restrictor. The restrictor 160C preferably comprises a local constriction having a maximum diameter of 1 millimeter.

The restricted additional venting line 160B serves to connect the pneumatic control relay line 120 pneumatically to the venting line 70, so that the pneumatic control relay line 120 is pneumatically connected to the venting connection 3 and/or a further venting connection 3A (not shown) by means of the additional venting line 160B.

Here the additional venting line 160B is formed as an opening 160E in the relay piston 160 of the venting valve 73. In another embodiment the additional venting line may also be formed by an opening in the venting valve housing 173 of the venting valve 73, for example in the form of an aperture 160G, wherein the aperture 160G preferably extends over a partial range of the valve lift of the relay piston 160 of the venting valve 73.

In another development the opening 160E is embodied in the form of a bore 160F through the relay piston 160 of the venting valve 73. Here a seal 160D is then provided, which seals off and closes the bore 160F in the open switching state of the venting valve 73.

Figure 6B:
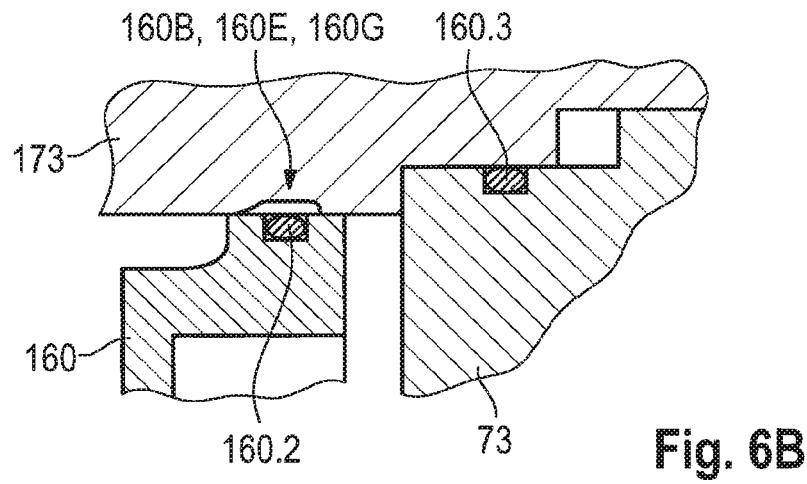
FIG. 6B shows schematic representation of a partial area of a venting valve according to an embodiment of the invention.
Figure 6C:
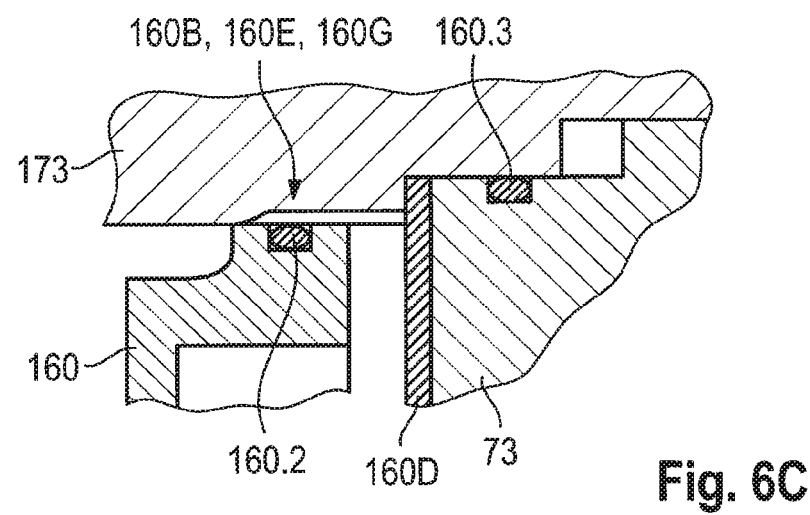
FIG. 6C shows a schematic representation of a partial area of a venting valve according to an embodiment of the invention.

FIGS. 6B and 6C show two schematic representations of a partial area of possible embodiments for a valve arrangement, in particular a partial area of a venting valve 73.

Referring to FIGS. 6B and 6C, both exemplary embodiments show a partial area of a venting valve 73, as represented and described, for example, in FIG. 6A. The venting valve 73 is formed by a venting valve housing 173, an additional venting line 160B, a relay piston 160 and corresponding (O-ring) seals 160.2, 160.3. The (restricted) additional venting line 160B here is formed as an opening 160 E, in particular as an aperture 160G, in the venting valve housing 173 of the venting valve 73. In particular, the aperture 160G in the venting valve housing 173 extends either over a partial range (FIG. 6B) of the valve lift of the relay piston 160 or over the entire range (FIG. 6C) of the valve lift of the relay piston 160 of the venting valve 73.

The exemplary embodiment shown in FIG. 6C additionally comprises a seal 160D for sealing off the additional venting line 160B, when the relay piston 160 of the venting valve 73 is displaced by the full valve lift.

Figure 7A:
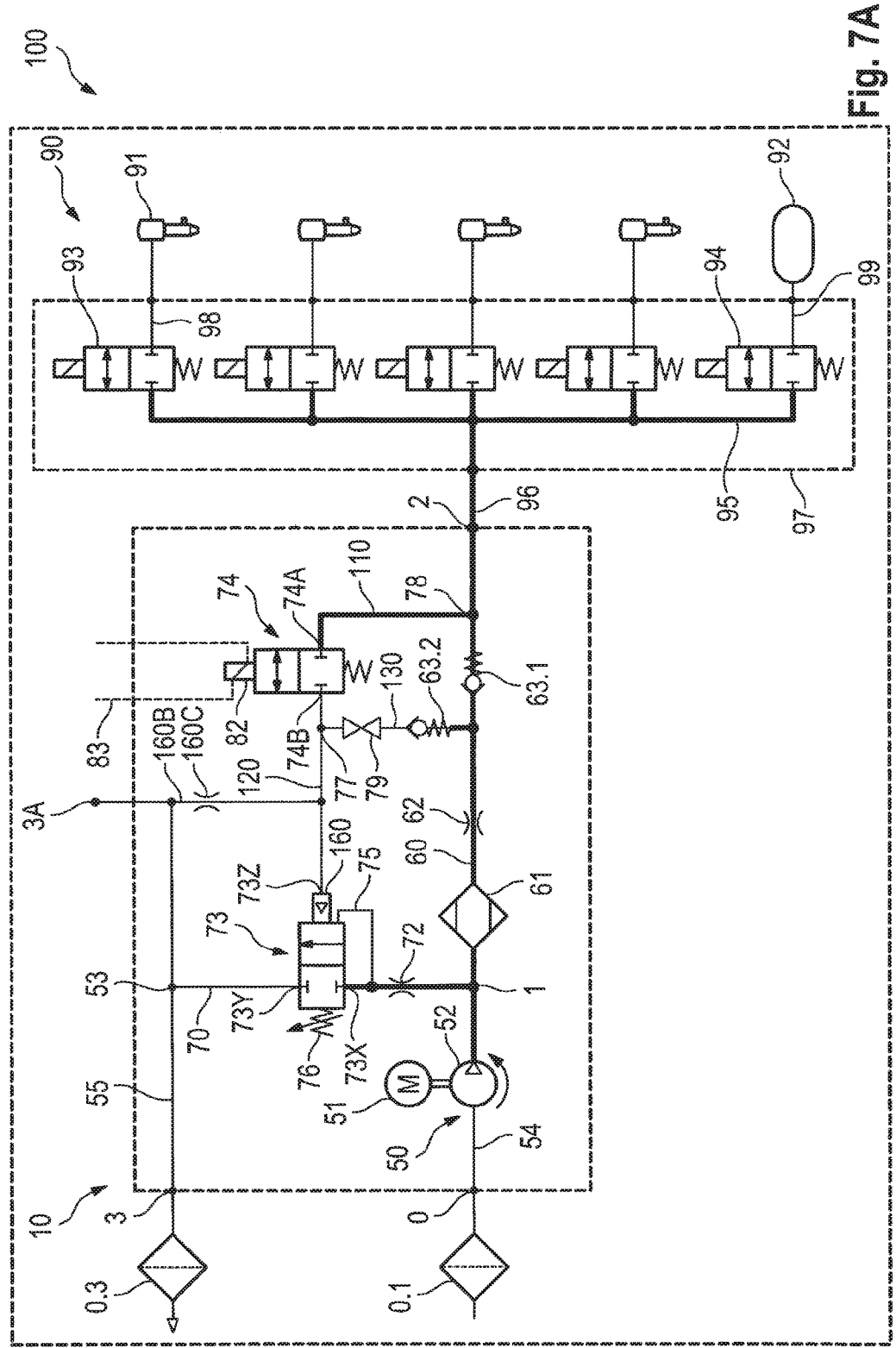
FIGS. 7A-E show a possible sequence according to a method for operation of a compressed air supply system of the embodiment of FIG. 4.
Figure 7B:
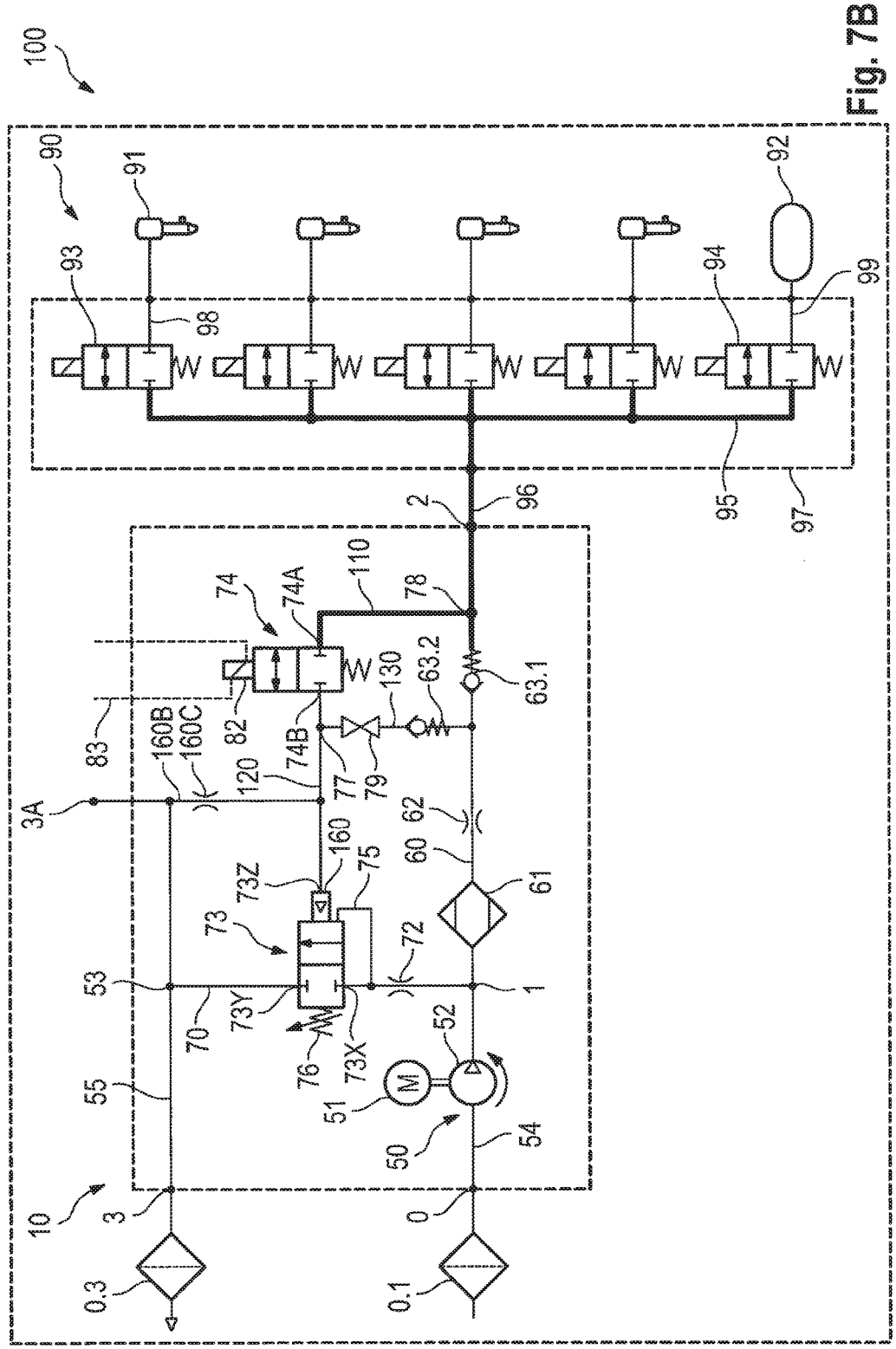
Figure 7C:
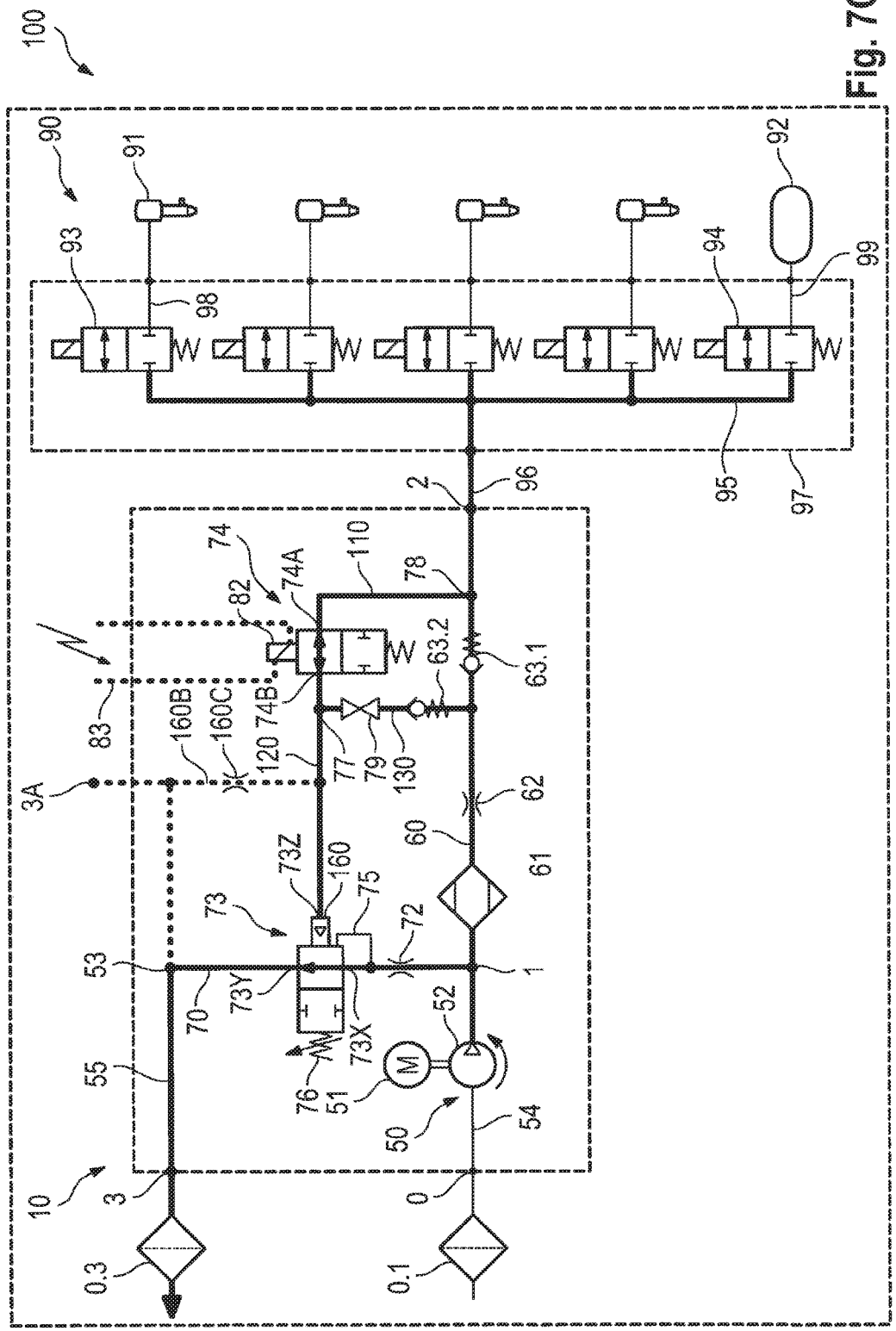
Figure 7D:
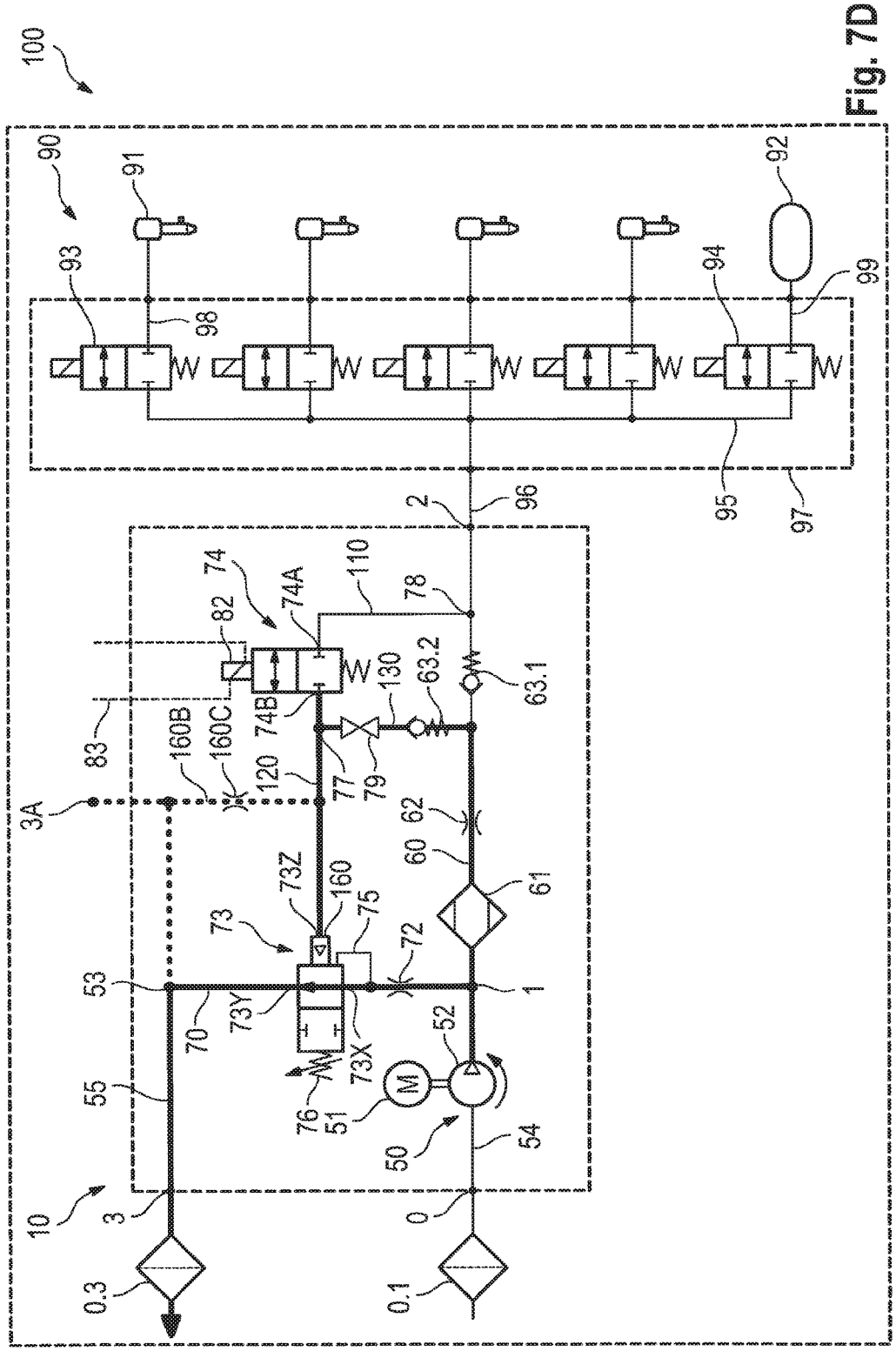
Figure 7E:
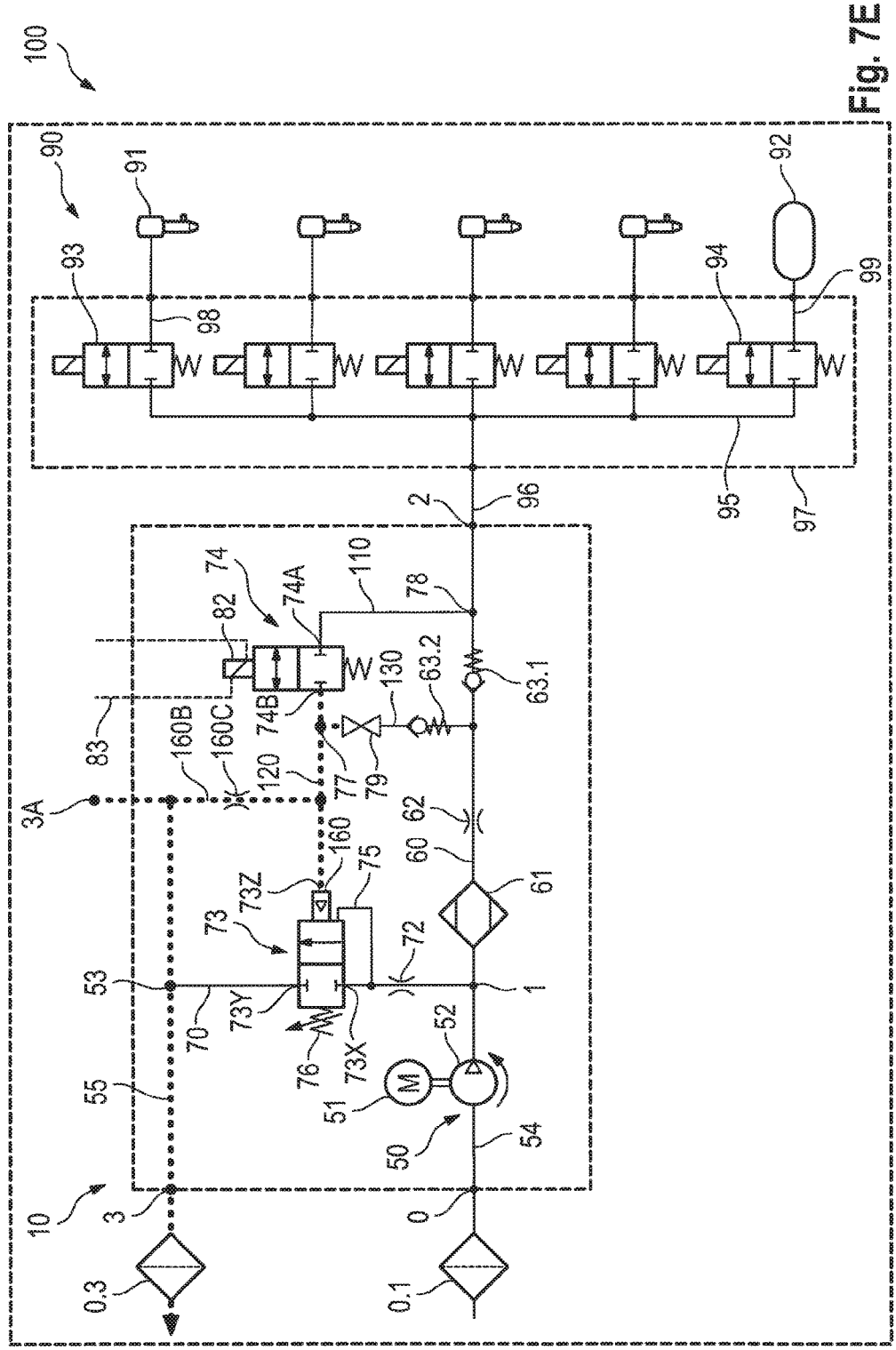

FIGS. 7A to 7E show a possible sequence for a method for the operation of a compressed air supply installation as represented in FIG. 4, for example, wherein FIG. 7A shows the beginning of the method, in particular the filling of the pneumatic unit 90, and FIG. 7E shows the end of the method, in particular the vented pneumatic unit 90. In FIG. 7A to FIG. 7E those lines which are filled with compressed air are emphasized in bold.

As described above, FIG. 7A first represents the filling of the pneumatic unit 90 via the main pneumatic line 60.

Here air is fed via the air feed 0 to an air filter 0.1 arranged upstream of the air feed 0, and via an intake line 54 to an air compressor 50 arranged downstream of the air feed 0 and driven by means of a motor 51 (M) and is delivered as compressed air (bold) to the compressed air supply installation. The compressed air is cleaned, in particular dried, in the drier 61 and is then conveyed via the main pneumatic line 60, the first isolating valve 63.1 and the compressed air connection 2 to the pneumatic unit 90. In the pneumatic unit 90 the compressed air is distributed via the further pneumatic line 96 and the gallery 95, all solenoid valves 93, 94 of the bellows 91 and of the reservoir 92 in this case being closed.

FIG. 7B represents the pneumatic unit 90 filled with compressed air (bold). Filling of the pneumatic unit 90 has by and large ensued, so that any further supply/admission of compressed air via the air feed 0, the intake line 54 and the compressor is no longer necessary. The first isolating valve 63.1 and the closed control valve 74 ensure that the compressed air cannot escape from the pneumatic unit 90. Here the 2/2-way directional control valve 74 is switched to a first, unenergized, closed switching state, which is closed between the control pressure input connection 74A and the control pressure output connection 74B, so that the control relay line 120, in particular, is isolated from the pressure/the compressed air in the main pneumatic line 60.

FIG. 7C shows the beginning of the venting process/ venting of the pneumatic unit 90, wherein the 2/2-way directional control valve is switched from the first, unenergized, closed switching state into the second switching state, which is opened between the control pressure input connection 74A and the control pressure output connection 74B to the control connection 73Z of the venting valve 73, so that the control relay line 120 can be subjected to pressure. For this purpose the control valve 74 is activated by a control signal (represented as a lightning symbol), in the form of a voltage and/or current signal relayed via an electronic control line 83 to a coil of the control valve 74, so that the control valve 74 is shifted from the first, closed switching state into the second, opened switching state.

After opening of the control valve 74, the control relay line 120 is filled with compressed air and the control connection 73Z of the venting valve 73 thus subjected to pressure, so that the venting valve 73 is shifted from the first, closed switching state into the second, opened switching state by actuation of the relay piston 160.

After opening of the venting valve 73, the compressed air is led out of the pneumatic unit 90 to the venting connection 3 via the branch connection 77, the control relay venting line 130, the shut-off valve 79 or restrictor, the non-return valve 63.2, the main pneumatic line 60, the first restrictor 62, the drier 61, the second restrictor 72 and the (opened) venting valve 73 and vented.

Simultaneously, venting also takes place via the additional venting line 160B to the venting connection 3 and/or to a further venting connection 3A, wherein the restrictor 160C in the additional venting line 160B ensures that only restricted venting (dotted line) occurs via this and the relay piston 160 of the venting valve 73 continues to be subjected to pressure, and the venting valve 73 still remains in the second, opened switching state.

FIG. 7D shows the end of the venting process/venting of the pneumatic unit 90, wherein the pneumatic unit 90 is fully vented, and the control valve 74, in the form of a 2/2-way directional control valve, is returned from the second, energized, opened switching state into the first, unenergized, closed switching state, which is closed between the control pressure input connection 74A and the control pressure output connection 74B. The pressure in the control line 160 is still sufficient, however, to actuate the relay piston 160 of the venting valve 73 and to continue to keep the venting valve 73 in the second, opened switching state.

If the pressure in the control relay line 120—by way of restricted venting through the additional venting line 160B to the venting connection 3 and/or the further venting connection 3A—continues to fall, the venting valve is also shifted from the second, open switching state (back) into the first, closed switching state. The residual compressed air (dotted line) can then escape via the restricted additional venting line 160B to the venting connection 3 and/or via the further venting connection 3A (cf. FIG. 7E).

The embodiments in FIG. 8 to FIG. 10 commented on below explain further advantages, features and details of the further variant of the invention by way of example, in particular how these are explained in claims 13 to 20 for a compressed air supply installation, a compressed air supply system and a method for the operation of a compressed air supply system. The embodiment of the further variant of the invention in FIG. 8, in particular, complements the embodiment in FIG. 2. The embodiment of the further variant of the invention in FIG. 9, in particular, complements the embodiment in FIG. 3. The embodiment of the further variant of the invention in FIG. 10, in particular, complements the embodiment in FIG. 4.

Reference is made below regarding this to the detailed description of FIG. 2, FIG. 3 and FIG. 4 and identical or similar features, or features serving an identical or similar function, are inasmuch identified and described using the same reference numerals in FIG. 2, FIG. 3 and FIG. 4, and in FIG. 8, FIG. 9 and FIG. 10, and reference is furthermore made to the description of FIG. 2, FIG. 3 and FIG. 4. In the following reference is made in particular to the differences and modifications of this further variant of the invention in FIG. 8, FIG. 9 and FIG. 10 and to the advantages achieved thereby. In all embodiments an increase in pressure due to a reduction in volume in a piston rear space may be specifically utilized as a damping element when switching or boosted by means of a reduction in volume.

Figure 8:
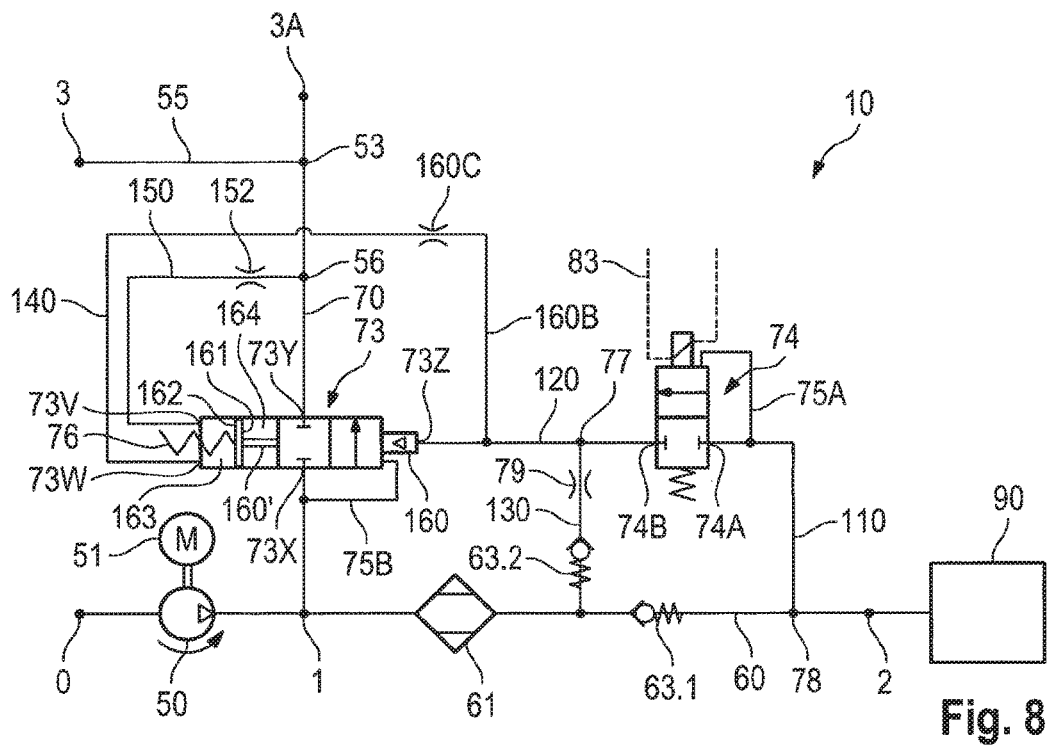
FIG. 8 shows an embodiment of the invention that complements the embodiment of FIG. 2.

The embodiment in FIG. 8 now shows that the additional venting line 160B, as it is also denoted in the embodiment of FIG. 2, is embodied as a feedback line 140 and therefore as additional venting line 160B also connects to the pneumatic control relay line 120. The feedback line 140 now furthermore connects (unlike the additional venting line 160B in FIG. 2) to a second control connection 73W of the venting valve 73. In FIG. 8 this further second control connection 73W of the venting valve 73 can be seen pneumatically connected to a venting connection 73V of the venting valve 73. Yet a further venting line 150 in turn connects to the venting connection 73V of the venting valve 73. The further venting line 150 is pneumatically connected to the venting connection 3 and the further venting connection 3A. For this purpose the further venting line 150 is connected by yet a further second venting branch connection 56 to the venting line 70, that is to say between the venting valve 73 and the first venting branch connection 53. As also in the embodiment in the FIG. 10, in the embodiment in FIG. 8 the venting rear space 163 on the relay piston extension 160' of the relay piston 160 is vented via the venting connection 73V of the venting valve 73.

The yet further venting line 150—specifically for venting the venting rear space 163 on the relay piston extension 160' of the relay piston 160, that is to say the venting rear space 163 between the control connection 73W and the venting connection 73V on the relay piston extension 160' of the venting valve 73 during actuation of the relay piston 160—is restricted in terms of the passage of compressed air by means of a restrictor, referred to here as a third restrictor 152. The thereby defined passage of compressed air from the venting rear space 163 on the relay piston extension 160' means that during actuation a movement of a relay piston 160 of the venting valve 73 is also damped.

The aforementioned additional venting line 160B as feedback line 140 is therefore connected to a venting rear space 163 of the venting valve 73, which is therefore further developed in contrast to the venting valve 73 of the embodiment in FIG. 2. The second control connection 73W is pneumatically connected to the venting connection 73V of the venting valve 73 via the venting rear space 163. The second control connection 73W can thereby be designed to receive a second control pressure fraction on the relay piston extension 160', which acts in addition to a first control pressure fraction of the first control connection 73Z. The second control connection 73W on the relay piston extension 160' is therefore embodied as a counter-control connection for receiving the second control pressure fraction, which acts in addition to the first control pressure fraction of the first control connection 73Z. This control pressure fraction is, in particular, for a limited time and acts on the relay piston extension 160' in the opposite direction to the first control pressure fraction of the first control connection 73Z on the relay piston 160. To put it another way, the control pressure, or at any rate a control pressure derived from this, acts on the first and second control face 161, 162 of the relay piston extension 160' and hence also with an effect on the relay piston 160. For this purpose the third restrictor 152 in the further venting line 150 to the venting rear space 163 may be designed with a relatively small nominal diameter NW3; this may serve, among other things, to damp a movement of a relay piston 160.

In practical terms the venting valve 73 here is designed for this purpose by means of a relay piston 160 that can be subjected to control pressure for switching the venting valve 73, in particular in an opened or closed state; in particular the venting valve 73 is embodied—as also already in the embodiment in FIG. 2—as a pneumatically actuated 2/2-way directional control valve. For this purpose the relay piston 160 now comprises, on the relay piston extension 160', a first control face 161 facing a control chamber 164 and a second control face 162 facing the aforementioned venting rear space 163. Here the first and the second control face 161, 162 are arranged for mutually opposed reception of the first control pressure fraction and the second control pressure fraction, wherein the first and second control pressure fraction are derived from the relay piston control line 120.

On actuation of the relay piston extension 160' and of the relay piston 160 in the venting valve, this design of the relay piston 160 with the relay piston extension 160' in the venting rear space 163, and interacting with the yet further venting line 150 for venting the latter, thereby allows the passage of compressed air through the yet further venting line 150 to be restricted by means of a third restrictor 152. In addition or alternatively, the thereby defined passage of compressed from the venting rear space 163 therefore also serves to damp a movement of the relay piston 160 on actuation of the relay piston extension 160'.

Figure 10:
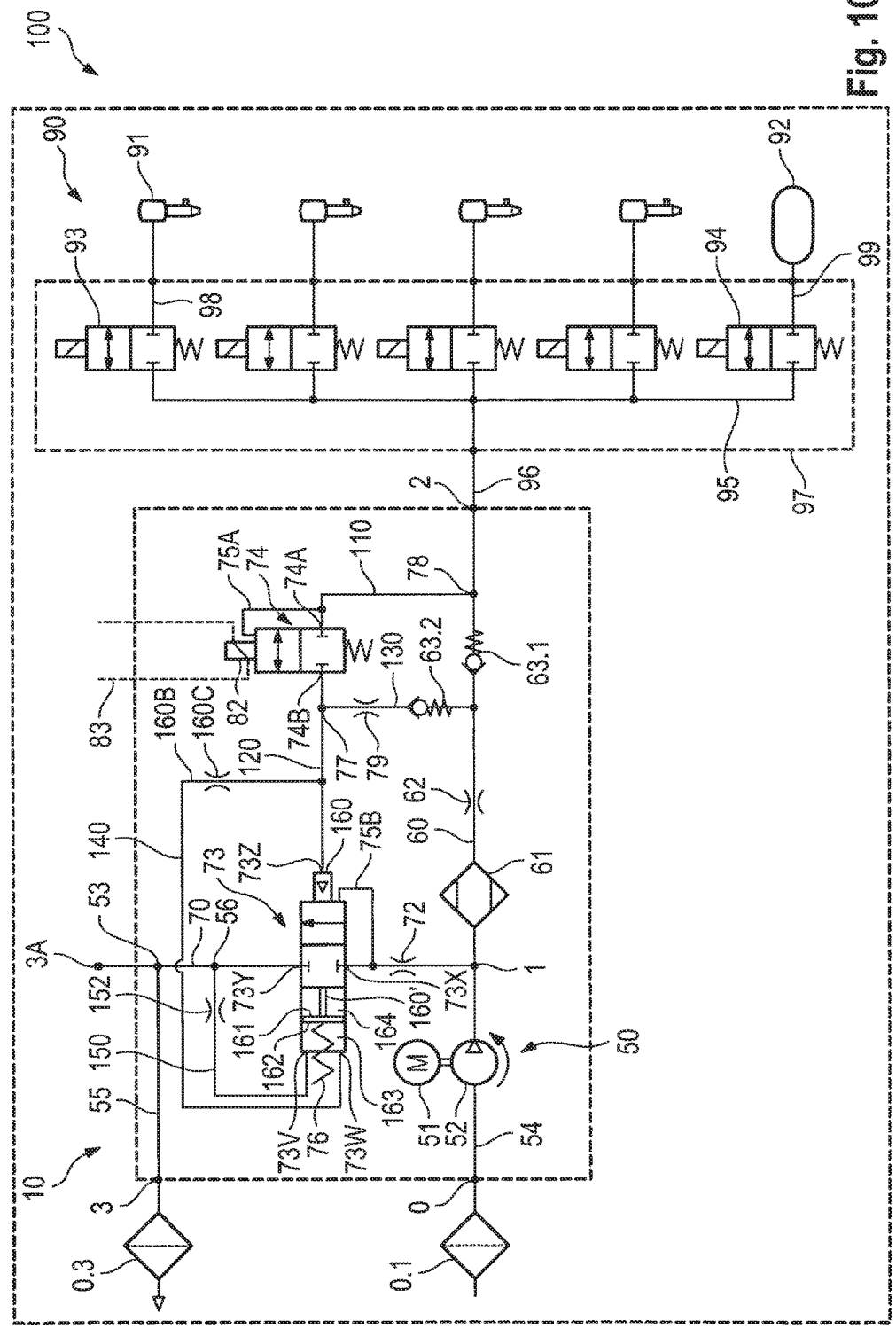
FIG. 10 shows compressed air supply system according to an embodiment of the invention that complements the embodiment of FIG. 4.

FIG. 10 basically shows precisely this function of the venting valve 73 in combination with the compressed air supply installation 10 and the pneumatic unit 90 as part of a compressed air supply system 100. In both cases in FIG. 8 and FIG. 10 the further second venting branch connection 56 of the further venting line 150 may be connected not in the venting line 70 but (not shown) in the discharge line 55. However, both possible ways of connecting the second venting branch connection 56—in the discharge line 55 or the venting line 70—are possible, depending on the flow resistance and design demands of the third restrictor 152 having a nominal diameter NW3.

Figure 9:
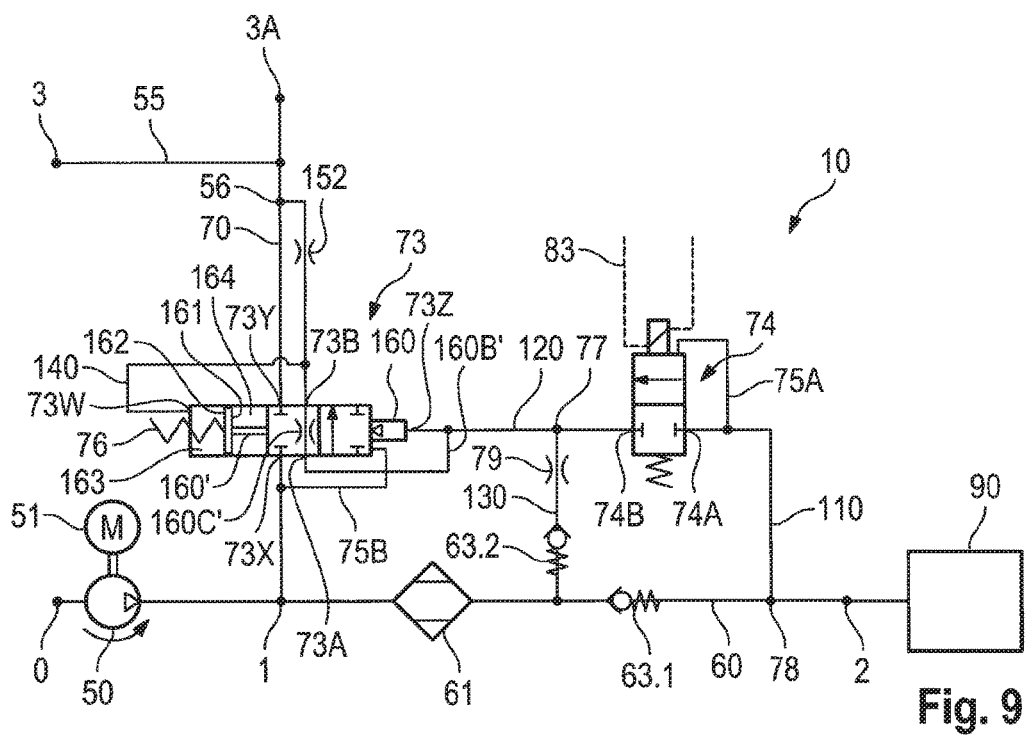
FIG. 9 shows an embodiment of the invention that complements the embodiment of FIG. 3.

The controllable venting valve 73 here—as also in FIG. 8 and FIG. 9 (in FIG. 2 to FIG. 5 this is denoted by the reference numeral 75)—is additionally provided with a pressure limiter 75B. Via a further pneumatic control line upstream of the venting valve 73—specifically between the second restrictor 72 and venting valve 73—the pressure limiter 75B taps a pressure, which if it exceeds a pressure threshold, lifts the piston of the venting valve 73 off from the valve seat against the force of an adjustable spring 76—that is to say it brings the controllable venting valve 73 into the opened position even without activation via the control valve 74. This serves to prevent an excessively high pressure accidently occurring in the pneumatic system 100.

In much the same way the control valve 74 in FIG. 8 and FIG. 9 and FIG. 10 is provided with a pressure limiter 75A. In addition, in FIG. 8, FIG. 9 and FIG. 10 the shut-off valve is advantageously replaced by a restrictor 79, since here the main air flow passes through during venting and regeneration of the air drier 61. The second non-return valve 63.2 is advantageously a lip valve having a shut-off function; a back-pressure that has built up there can advantageously also assist in the filling of a pilot volume in the area of the control relay line 120 to the control connection 73Z during venting.

FIG. 9 shows a preferred modified embodiment with the aforementioned complementary variant of the invention to the embodiment of the FIG. 3. Here too, reference is first made to the description of FIG. 3 and followed by further explanation below. Here, however, a separate feedback line 140—which is therefore connected to a venting rear space 163 of the venting valve 73 via a second control connection 73W—connects to the additional venting line 160W downstream of the additional restrictor 160C, that is to say even before this additional venting line 160W itself connects to the venting line 70 at the further second venting branch connection 56. In all exemplary embodiments in FIG. 8, FIG. 9 and FIG. 10 the relay piston 160 of the venting valve 73 opens the air drier 61 more slowly due to the force acting on the relay piston extension 160' and delays the reduction in pressure in such a way that a venting report is significantly dampened or reduced; (for example, 7 dBA were measured in the air drier with a pulse generator at 10 bar).

Unlike the embodiment in FIG. 10 and FIG. 8, in the embodiment in FIG. 9 the venting rear space 163 on the relay piston extension 160' of the relay piston 160 is again vented via the second control connection 73W of the venting valve 73; that is to say via the feedback line 140, the third restrictor 152, then the venting line 70 and finally via the discharge line 55 to the venting connection 3.

In all the aforementioned embodiments—particularly for a venting process as illustrated in FIG. 7C and as can be similarly shown in FIG. 10—a particular sequence results in the movement of the relay piston 160, which ensues due to an air cushion actually developing according to the description above, something that occurs on opening of the venting valve 73 downstream of the relay piston 160, that is to say on the relay piston extension 160'. Embodiments that can be shown as particularly advantageous for this process are those in FIG. 11 and FIG. 12, with a modification compared to FIG. 8 and FIG. 10, which with some modifications to the aforementioned embodiments assist this process of an air cushion actually developing in accordance with the description above and which are described in more detail below. Differences between the modifications in FIG. 11 and FIG. 12 exist only in relation to the connection of the additional restrictor 160C" either to the venting connection 73V (FIG. 11) or the control connection 73Z (FIG. 12) of the venting valve 73.

Figure 11:
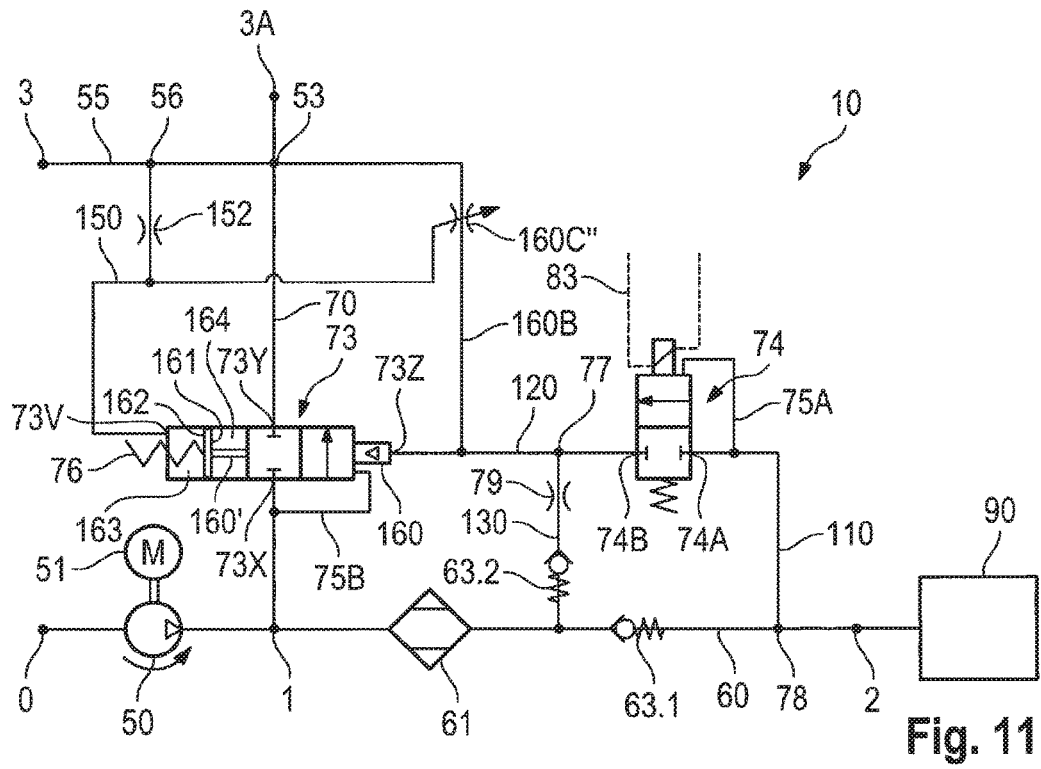
FIG. 11 shows a compressed air supply installation according to an embodiment of the invention with a modification as compared to the embodiments of FIG. 8 and FIG. 10 in order to support an air cushion on a relay piston.
Figure 12:
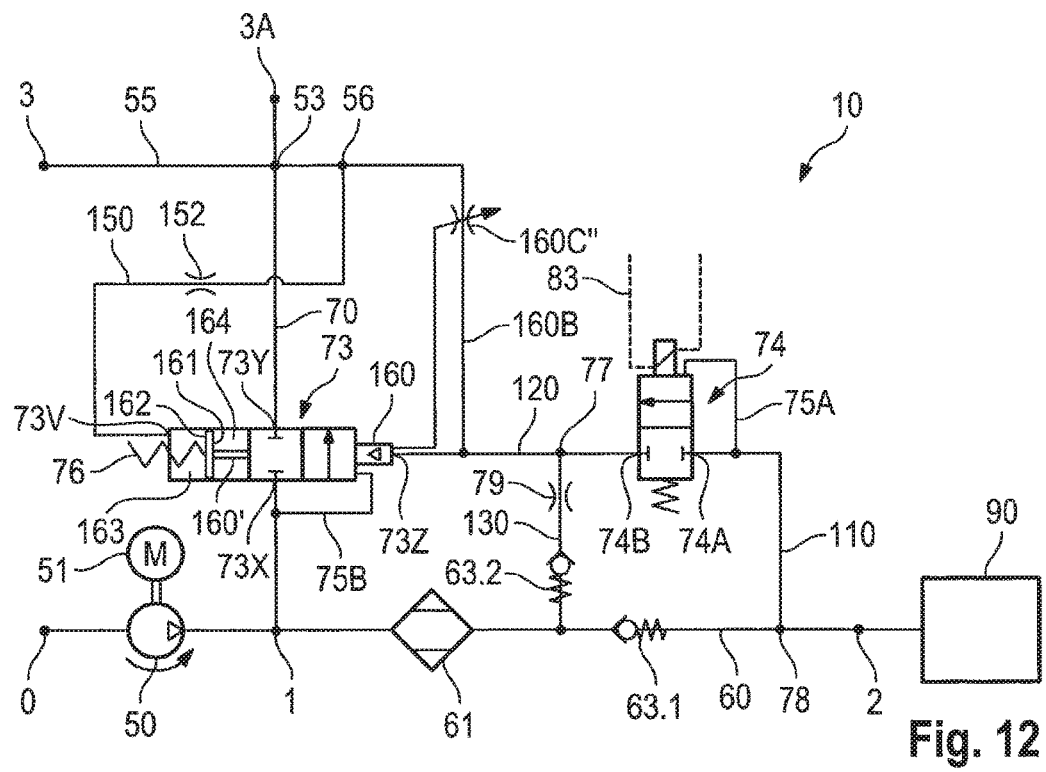
FIG. 12 shows a compressed air supply installation according to an embodiment of the invention with a modification compared to the embodiments of FIG. 8 and FIG. 10 in order to support an air cushion on a relay piston.

In these embodiments in FIG. 11 and FIG. 12, in particular, the relay piston 160 in fact seals off the bypass of the further venting line 150 almost tightly, when it rests on the stop; that is to say it closes the venting connection 73V and/or the second control connection 73W. The additional restrictor 160C" here is in this respect rather a type of adjustable restrictor, the effective nominal passage diameter of which is controlled by the relay piston 160 with the relay piston extension 160'. The additional restrictor 160C" is not quite tight, however, in order that the pilot chamber in the area of the control connection 73Z and the control relay line 120 and also the venting rear space 163 may be vented by the additional restrictor 160C" via the bypass of the venting line 160B, 160B', when the magnet for the control valve 74 closes again and the control valve 74 is closed.

The particular resulting sequence for the embodiments in FIG. 11 and FIG. 12 is thereby approximately as follows: when the magnet of the venting valve 74 closes and this as it were initial venting through leakage ceases, the pressure below the relay piston 160 on the relay piston extension 160' and at the pilot chamber in the area of the control connections 73Z and the control relay line 120 subsides. The leakage losses from the virtually closed additional restrictor 160C" are therefore reduced. The relay piston 160 then initially falls slowly under the spring force of the valve spring 76. When the additional restrictor 160C" opens further, the process accelerates until the pilot chamber in the area of the control connection 73Z and the control relay line 120 and the gallery 95, and finally the rear space 163, through which the residual air flows off via the additional venting line 160B, is completely vented At the point of the first venting branch connection 53 the air flows meet as before. Alternatively the third restrictor 152 could also still be arranged there. Moreover, the order of the venting branch connections 53 and 56 in the additional venting line 160B can also be varied, as necessary. It is the balancing of the third restrictor 152 and the additional restrictor 160C" which makes a difference to the pneumatic damping; the variation in cross section in the additional restrictor 160C" tends rather to effect the said timing. The air cushion, on account of the counter-force, might also be seen as a working cylinder, which assists the valve spring 76 in opening, but then rapidly reduces the force via the third restrictor 152. The valve spring 76 is then solely responsible for the closure. Similarly the principle of the adjustable restrictor explained above can also be transferred to the additional restrictor 160C' in the embodiment in FIG. 9.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 0.1 air filter
0.3 filter/silencer
0 air feed
1 compressed air feed
2 compressed air connection
3 venting connection
3A further venting connection
10 compressed air supply installation
50 air compressor
51 motor
52 compressor of the air compressor
53 first venting branch connection
54 intake line
55 discharge line
56 further second venting branch connection
60 main pneumatic line
61 air drier
62 first restrictor
63.1 first non-return valve
63.2 second non-return valve
64 additional venting valve
64X first connection of the additional venting valve
64Y second connection of the additional venting valve
64Z control connection of the additional venting valve
65 relay piston
70 venting line
72 second restrictor
73 venting valve
73A first venting valve connection for additional control relay line
73B second venting valve connection for additional control relay line
73V venting connection
73W second control connection
73X first venting valve connection of the venting valve
73Y second venting valve connection of the venting valve
73Z control connection of the venting valve
74 control valve
74A control pressure input connection 74B control pressure output connection
74C venting connection of the control valve
75, 75A, 75B pressure limiter
76 valve spring
77 branch connection
78 main branch connection
79 shut-off valve or restrictor
82 coil
83 control line
90 pneumatic unit
91 bellows
92 reservoir
93 solenoid valve
94 solenoid valve
95 gallery
96 further pneumatic line
97 valve block
98 spring branch line
99 reservoir branch line
100 compressed air supply system
110 control line
120 control relay line (relay piston control line)
130 control relay venting line
140 feedback line
150 further venting line
152 third restrictor
160, 160' relay piston, relay piston extension
160B, 160B' additional venting line
160C, 160C', 160C" additional restrictor, additional restrictor in venting valve 73, additional restrictor as adjustable restrictor
160D seal
160E opening
160F bore
160G aperture
161 first control face
162 second control face
163 venting rear space
164 control chamber
170 further venting line
173 venting valve housing

The invention claimed is:

1. A compressed air supply installation for the operation of a pneumatic system, the compressed air supply installation comprising:
a compressed air feed;
a compressed air connection to a pneumatic unit;
a venting connection;
a main pneumatic line disposed between the compressed air feed and the compressed air connection; and
a first venting line disposed between the compressed air connection and the venting connection, the first venting line including a venting valve comprising a first venting valve connection, a second venting valve connection, and a control connection pneumatically connected to a control valve by a pneumatic control relay line,
wherein the venting valve is closed between the first venting valve connection and the second venting valve connection to the venting connection in a first switching state of the venting valve and is opened between the first venting valve connection and the second venting valve connection to the venting connection in a second switching state of the venting valve,
wherein the control valve is closed between a control pressure input connection and a control pressure output connection to the control connection in a first switching state of the control valve and is opened between the control pressure input connection and the control pressure output connection to the control connection in a second switching state of the of the control valve in order to subject the control connection of the venting valve to pressure and to shift the venting valve from the first or second switching state of the venting valve into second or first switching state of the venting valve,
wherein the control valve is a 2/2-way directional control valve, and
wherein the pneumatic control relay line is connected to the venting connection by an additional venting line in at least one of the first or second switching state of the venting valve.

2. The compressed air supply installation as claimed in claim 1, wherein a restrictor is arranged in the additional venting line.

3. The compressed air supply installation as claimed in claim 1, wherein the restrictor has a diameter of less than/equal to 1 mm.

4. The compressed air supply installation as claimed in claim 1, wherein the additional venting line is pneumatically connected to a portion of the first venting line between the second venting valve connection and the venting connection and/or to the further venting connection.

5. The compressed air supply installation as claimed in claim 1, wherein the additional venting line is connected to the venting connection and/or to the further venting connection regardless of the switching state of the venting valve.

6. The compressed air supply installation as claimed in claim 1, wherein the pneumatic control relay line is a relay piston control line for a relay piston of the venting valve.

7. The compressed air supply installation as claimed in claim 6, wherein the additional venting line is formed as an opening in the relay piston or in the venting valve housing of the venting valve.

8. The compressed air supply installation as claimed in claim 7, wherein the opening in the relay piston is formed as a bore in the relay piston.

9. The compressed air supply installation as claimed in claim 7, further comprising a seal that seals off and closes the opening in the relay piston in the first or second switching state of the venting valve.

10. The compressed air supply installation as claimed in claim 7, wherein the opening in the relay piston is formed as an aperture in the venting valve housing of the venting valve, wherein the aperture is formed over a partial range of the valve lift of the relay piston of the venting valve.

11. The compressed air supply installation as claimed in claim 1, wherein the control valve is a solenoid control valve.

12. The compressed air supply installation as claimed in claim 11, wherein the first switching state of the control valve is an unenergized switching state and the second switching state of the control valve is an energized switching state.

13. The compressed air supply installation as claimed in claim 1, wherein the additional venting line is a feedback line, wherein the feedback line connects to the pneumatic control relay line and a second control connection of the venting valve.

14. The compressed air supply installation as claimed in claim 13, wherein in the case of a venting connection of the venting valve, yet a second additional venting line is connected, the second additional venting line being pneumatically connected to the venting connection.

15. The compressed air supply installation as claimed in claim 13, wherein the second control connection is designed for receiving a second control pressure fraction, which acts in addition to a first control pressure fraction of the first control connection.

16. The compressed air supply installation as claimed in claim 13, wherein the second control connection is embodied as a counter-control connection, which is designed to receive a second control pressure fraction, which acts in addition to a first control pressure fraction of the first control connection and for a limited time and in the opposite direction to a first control pressure fraction of the first control connection.

17. The compressed air supply installation as claimed in claim 13, wherein the additional venting line is pneumatically connected as a feedback line to a venting rear space of the venting valve and to the venting connection, and wherein the second additional venting line connects by yet a further second venting branch connection to the first venting line 70.

18. The compressed air supply installation as claimed in claim 13, wherein the venting valve is formed by means of a relay piston which can be subjected to control pressure, wherein the control pressure can be controlled by the control valve, wherein the relay piston is designed for switching of the venting valve into an opened or closed state, wherein the venting valve is a pneumatically actuated 2/2-way directional control valve, wherein the relay piston has a first control face facing a control chamber and a second control face facing a venting rear space, and wherein the first control face and the second control face are arranged for mutually opposed reception of the first control pressure fraction and of the second control pressure fraction, wherein the first and second control pressure fractions are derived from the relay piston control line.

19. The compressed air supply installation as claimed in claim 13, wherein a second additional venting line, which connects by yet a further second venting-branch connection to the first venting line between the venting valve and the first venting-branch connection, connects to the venting rear space, particularly in the case of a venting connection of the venting valve.

20. The compressed air supply installation as claimed in claim 13, wherein a second additional venting line is designed for venting the venting rear space of the venting valve when the relay piston is actuated, and the passage of compressed air through the second additional venting line is restricted by means of a third restrictor, and/or wherein a movement of the relay piston when actuated is also damped owing to the thereby defined passage of compressed air from the venting rear space.

21. A compressed air supply system having a compressed air supply installation as claimed in claim 1 and having a pneumatic unit, in particular an air suspension system of a vehicle, preferably an automobile, in particular comprising a gallery, which comprises at least one branch line pneumatically connected to the gallery with a bellows and/or a reservoir together with a directional control valve connected upstream of the bellows and/or the reservoir.

22. A method for the operation of a compressed air supply system as claimed in claim 21, wherein the method comprising the following steps:
    ventilating the pneumatic unit, wherein the 2/2-way directional control valve is switched into the first switching state, which is closed between the control pressure input connection and the control pressure output connection to the control connection, in order to isolate the control relay line from the pressure in the main pneumatic line; and
    venting of the pneumatic unit, wherein the 2/2-way directional control valve is switched into the second switching state, which is opened between the control pressure input connection and the control pressure output connection to the control connection of the venting valve, in order to subject the control relay line to pressure,
    wherein the control relay line in the first and/or second switching state of the control valve is connected via an additional venting line to the venting connection and/or to the further venting connection.

23. The method for the operation of a compressed air supply system as claimed in claim 22, wherein the connection of the additional venting line to the venting connection is closed in the second switching state of the control valve and/or in the second switching state of the venting valve by a seal.

24. A vehicle, preferably a utility vehicle, having a compressed air supply system as claimed in claim 21.

* * * * *